US009200555B2

United States Patent
Yoshioka

(10) Patent No.: US 9,200,555 B2
(45) Date of Patent: Dec. 1, 2015

(54) CONTROL DEVICE FOR ELECTRICALLY HEATED CATALYST

(75) Inventor: Mamoru Yoshioka, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/355,089

(22) PCT Filed: Nov. 2, 2011

(86) PCT No.: PCT/JP2011/075337
§ 371 (c)(1),
(2), (4) Date: Apr. 29, 2014

(87) PCT Pub. No.: WO2013/065157
PCT Pub. Date: May 10, 2013

(65) Prior Publication Data
US 2014/0311134 A1 Oct. 23, 2014

(51) Int. Cl.
F01N 3/027 (2006.01)
F01N 3/20 (2006.01)
(Continued)

(52) U.S. Cl.
CPC ............ *F01N 3/2013* (2013.01); *F01N 3/2026* (2013.01); *F01N 9/00* (2013.01); *F01N 3/0238* (2013.01); *F01N 3/0275* (2013.01); *F01N 3/035* (2013.01); *F01N 3/2867* (2013.01); *F01N 3/32* (2013.01); *F01N 9/007* (2013.01); *F01N 13/14* (2013.01); *F01N 2240/16* (2013.01); *F01N 2390/02* (2013.01); *F01N 2900/1404* (2013.01); *F01N 2900/1602* (2013.01); *F01N 2900/1606* (2013.01); *F01N 2900/1631* (2013.01); *Y02T 10/26* (2013.01); *Y02T 10/47* (2013.01)

(58) Field of Classification Search
CPC ..... F01N 3/0238; F01N 3/0275; F01N 3/035; F01N 3/2026; F01N 3/2867; F01N 3/32; F01N 9/007; F01N 13/14; F01N 2240/16; F01N 2390/02; F01N 2900/1404; F01N 2900/1602; F01N 2900/1606; F01N 2900/1631
USPC ........... 60/275, 277, 286, 289, 295, 300, 303, 60/320
See application file for complete search history.

(56) References Cited

U.S. PATENT DOCUMENTS 5,456,063 A 10/1995 Yoshizaki et al.
7,829,048 B1 * 11/2010 Gonze et al. ............... 423/213.2
(Continued)

FOREIGN PATENT DOCUMENTS

JP 05-269387 B2 10/1993
JP 06-017644 1/1994
(Continued)

*Primary Examiner* — Jason Shanske
*Assistant Examiner* — Jorge Leon, Jr.
(74) *Attorney, Agent, or Firm* — Kenyon & Kenyon LLP

(57) ABSTRACT

A purpose of the present invention is to prevent a PM-caused short circuit between a heating element and a case in an electrically heated catalyst. The electrically heated catalyst is provided in an exhaust gas passage of an internal combustion engine the air-fuel ratio of which is controlled at a ratio near a theoretical air-fuel ratio at an operation time. The electrically heated catalyst includes a heating element that generates heat through electric conduction, a case that stores the heating element therein, and an insulating member sandwiched between the heating element and the case. According to the present invention, the heating element is electrically conducted after the operation of the internal combustion engine is stopped.

18 Claims, 15 Drawing Sheets

(51) Int. Cl.
*F01N 3/035* (2006.01)
*F01N 13/14* (2010.01)
*F01N 9/00* (2006.01)
*F01N 3/023* (2006.01)
*F01N 3/32* (2006.01)
*F01N 3/28* (2006.01)

(56) References Cited

U.S. PATENT DOCUMENTS

| | | | |
|---|---|---|---|
| 8,056,320 B2 * | 11/2011 | Gonze et al. | 60/284 |
| 8,667,781 B2 * | 3/2014 | Yoshioka et al. | 60/285 |
| 2009/0094963 A1 * | 4/2009 | Mizoguchi et al. | 60/286 |
| 2012/0131907 A1 * | 5/2012 | Yoshioka et al. | 60/276 |
| 2012/0225752 A1 * | 9/2012 | Gonze et al. | 477/100 |
| 2012/0260638 A1 * | 10/2012 | Yoshioka et al. | 60/295 |
| 2013/0011300 A1 * | 1/2013 | Yoshioka et al. | 422/109 |

FOREIGN PATENT DOCUMENTS

| | | |
|---|---|---|
| JP | 06-074028 | 3/1994 |
| JP | 2010-185345 A | 8/2010 |

* cited by examiner

CONTROL DEVICE FOR ELECTRICALLY HEATED CATALYST

CROSS-REFERENCE TO RELATED APPLICATIONS

This is a national phase application based on the PCT International Patent Application No. PCT/JP2011/075337 filed Nov. 2, 2011, the entire contents of which are incorporated herein by reference.

TECHNICAL FIELD

The present invention relates to a control device for an electrically heated catalyst that controls an electrically heated catalyst provided in the exhaust gas passage of an internal combustion engine.

BACKGROUND ART

Conventionally, an electrically heated catalyst (hereinafter sometimes called EHC) has been developed as an exhaust gas purification catalyst provided in the exhaust gas passage of an internal combustion engine. This catalyst is heated by a heating element that generates heat when electrically conducted.

In an EHC, an insulating member for insulating electricity is provided between a heating element, which generates heat by electric conduction, and a case in which the heating element is stored. For example, for use with an EHC, Patent Literature 1 discloses a technology for providing an insulator mat between a carrier, which generates heat by electric conduction, and a case in which the carrier is stored. Such an insulating member, if provided, can prevent a short circuit between the heating element and the case.

Patent Literature 2 discloses a technology for supplying secondary air to the EHC with the EHC heated to an activation temperature. This is accomplished by starting the operation of an electric air power pump after the operation of the EHC is started at a cold start time of an internal combustion engine.

Patent Literature 3 discloses a technology for use in a hybrid system. This technology controls electric conduction to the heater of an air-fuel sensor, provided in the exhaust gas passage of an internal combustion engine, while the operation of the internal combustion engine is stopped.

CITATION LIST

Patent Literature

Patent Literature 1: Japanese Patent Application Publication No. 05-269387 (JP 05-269387 A)
Patent Literature 2: Japanese Patent Application Publication No. 06-074028 (JP 06-074028 A)
Patent Literature 3: Japanese Patent Application Publication No. 2010-185345 (JP 2010-185345 A)

SUMMARY OF THE INVENTION

Problem to be Solved by the Invention

In an EHC, the end of the insulating member provided between the heating element and the case is exposed to an exhaust gas. Therefore, conductive particulate matters (hereafter sometimes called PM), included in the exhaust gas, adhere to the end of the insulating member. As a result, as the PM deposits on the end of the insulating member, there is a danger that the PM will cause a short circuit between the heating element and the case.

In view of this problem, it is an object of the present invention to prevent a PM-caused short circuit between the heating element and the case in an EHC.

Means for Solving the Problem

The present invention electrically conducts a heating element after the operation of an internal combustion engine is stopped to heat the end of an insulating member, thereby oxidizing and removing a PM deposited on the end of the insulating member.

More specifically, a control device for an electrically heated catalyst according to the present invention is a control device for an electrically heated catalyst provided in an exhaust gas passage of an internal combustion engine, an air-fuel ratio of the internal combustion engine being controlled at a ratio near a theoretical air-fuel ratio at an operation time, the electrically heated catalyst comprising:

a heating element that is heated by electric conduction to heat the catalyst by the heating;

a case that stores the heating element therein; and an insulating member provided between the heating element and the case to insulate electricity wherein the control device for an electrically heated catalyst comprises an electric conduction control unit that electrically conducts the heating element after an operation of the internal combustion engine is stopped.

If the air-fuel ratio is controlled at a theoretical air-fuel ratio during the operation of the internal combustion engine, oxygen for oxidizing a PM is insufficient in the exhaust gas. Therefore, even if the temperature of the end of the insulating member rises, it is difficult to oxidize a PM deposited on the end of the insulating member during the operation of the internal combustion engine. To solve this problem, the present invention electrically conducts the heating element to heat the end of the insulating member after the operation of the internal combustion engine is stopped. By doing so, the end of the insulating member can be heated with sufficient oxygen included in the exhaust gas. As a result, a PM deposited on the end of the insulating member can be oxidized and removed.

Therefore, the present invention prevents a PM-caused short circuit between the heating element and the case.

The operation stop of an internal combustion engine in the present invention refers to the stop of fuel injection in the internal combustion engine. The operation stop of an internal combustion engine in the present invention may include not only a case in which fuel injection in the internal combustion engine is stopped when a vehicle, in which the internal combustion engine is installed, is stopped but also a case in which fuel injection in the internal combustion engine is stopped, for example, when the vehicle is decelerated (the so-called fuel cut control is performed).

The expression "after the operation is stopped" used in the description of the present invention includes the state in which the engine rotation still continues by inertial force immediately after fuel injection in the internal combustion engine is stopped and the state in which a predetermined period of time elapses after fuel injection in the internal combustion engine is stopped.

In the present invention, when a temperature of the EHC or a temperature of an exhaust gas correlated with the temperature of the EHC when the operation of the internal combustion engine is stopped is equal to or higher than a first predetermined temperature, the electric conduction control unit may either inhibit electric conduction to the heating element or electrically conduct the heating element after a predetermined electric conduction stop period elapses from when the operation of the internal combustion engine is stopped.

Here, the first predetermined temperature refers to a temperature equal to or higher than a temperature threshold at which a PM, deposited on the end of the insulating member, can be oxidized. The predetermined electric conduction stop period may be a period that elapses until the temperature of the EHC or the temperature of the exhaust gas correlated with the EHC becomes lower than the first predetermined temperature.

In the present invention, when the temperature of the EHC or the temperature of the exhaust gas correlated with the temperature of the EHC when the operation of the internal combustion engine is stopped is equal to or lower than a second predetermined temperature, the electric conduction control unit may inhibit electric conduction to the heating element.

Here, the second predetermined temperature refers to a temperature equal to or lower than a temperature threshold at which it is difficult to increase the temperature of the end of the insulating member to a temperature at which a PM, deposited on the end of the insulating member, is sufficiently oxidized even if the heating element is electrically conducted.

These prevent unnecessary electric conduction to the heating element.

In the present invention, when a deposit amount of a PM on an end of the insulating member when the operation of the internal combustion engine is stopped is equal to or smaller than a predetermined amount, the electric conduction control unit may inhibit electric conduction to the heating element.

Here, the predetermined amount refers to an amount equal to or smaller than the threshold of the PM deposit amount with which it can be determined that a short circuit will not be generated between the heating element and the case.

This also prevents unnecessary electric conduction to the heating element.

In the present invention, when the deposit amount of a PM on the end of the insulating member is large when the operation of the internal combustion engine is stopped, the electric conduction control unit may perform at least one of control to increase an electric conduction amount per unit time when electrically conducting the heating element and control to increase an electric conduction time when electrically conducting the heating element as compared when the deposit amount of a PM is small.

In the present invention, when the temperature of the EHC or the temperature of an exhaust gas correlated with the temperature of the EHC when the operation of the internal combustion engine is stopped is low, the electric conduction control unit may perform at least one of control to increase the electric conduction amount per unit time when electrically conducting the heating element and control to increase the electric conduction time when electrically conducting the heating element as compared when the temperature is high.

In the present invention, when a particulate diameter of a PM deposited on the end of the insulating member is large, the electric conduction control unit may perform at least one of control to increase the electric conduction amount per unit time when electrically conducting the heating element and control to increase the electric conduction time when electrically conducting the heating element as compared when the particulate diameter of a PM is small.

These can sufficiently oxidize and remove a PM deposited on the end of the insulating member while reducing power consumption as much as possible.

In the present invention, as the time elapses, the electric conduction control unit may increase the electric conduction amount per unit time during an electric conduction period when electrically conducting the heating element.

After the operation of the internal combustion engine is stopped, the ambient temperature of the EHC is decreased as the time elapses. Therefore, the temperature of the end of the insulating member can be maintained approximately at a constant value, at which a PM can be oxidized, during the period of electric conduction by increasing the electric conduction amount per unit time as the time elapses. This further facilitates the oxidization of a PM deposited on the end of the insulating member.

The control device for an electrically heated catalyst according to the present invention may further comprise an air amount increase unit. The air amount increase unit increases, via the electric conduction control unit, an amount of air to be supplied to the EHC when electrically conducting the heating element. This further facilitates the oxidization of a PM deposited on the end of the insulating member.

The control device for an electrically heated catalyst according to the present invention may further comprise a heater. To the heater, electricity is supplied via a path, different from a path via which electricity is supplied to the heating element, to heat the end of the insulating member. In this case, the end of the insulating member can be heated when the heater is electrically conducted in the same way as when the heating element is electrically conducted.

When the control device for an electrically heated catalyst according to the present invention comprises the heater, the electric conduction control unit may control electric conduction to the heater instead of electric conduction to the heating element after the operation of the internal combustion engine is stopped. That is, electric conduction to the heating element described above may be applied also to electric conduction to the heater. This also gives the same effect as that given by the control described above.

Effects of the Invention

The present invention prevents a PM-caused short circuit between a heating element and a case in an EHC.

MODES FOR CARRYING OUT THE INVENTION

Specific embodiments of the present invention will be described below with reference to the drawings. Unless otherwise specified, it is not intended to limit the technical scope of the present invention only to the sizes, materials, shapes, and relative arrangements of the components described in the embodiments.

First Embodiment

General Configuration of an EHC and its Control System

Figure 1:
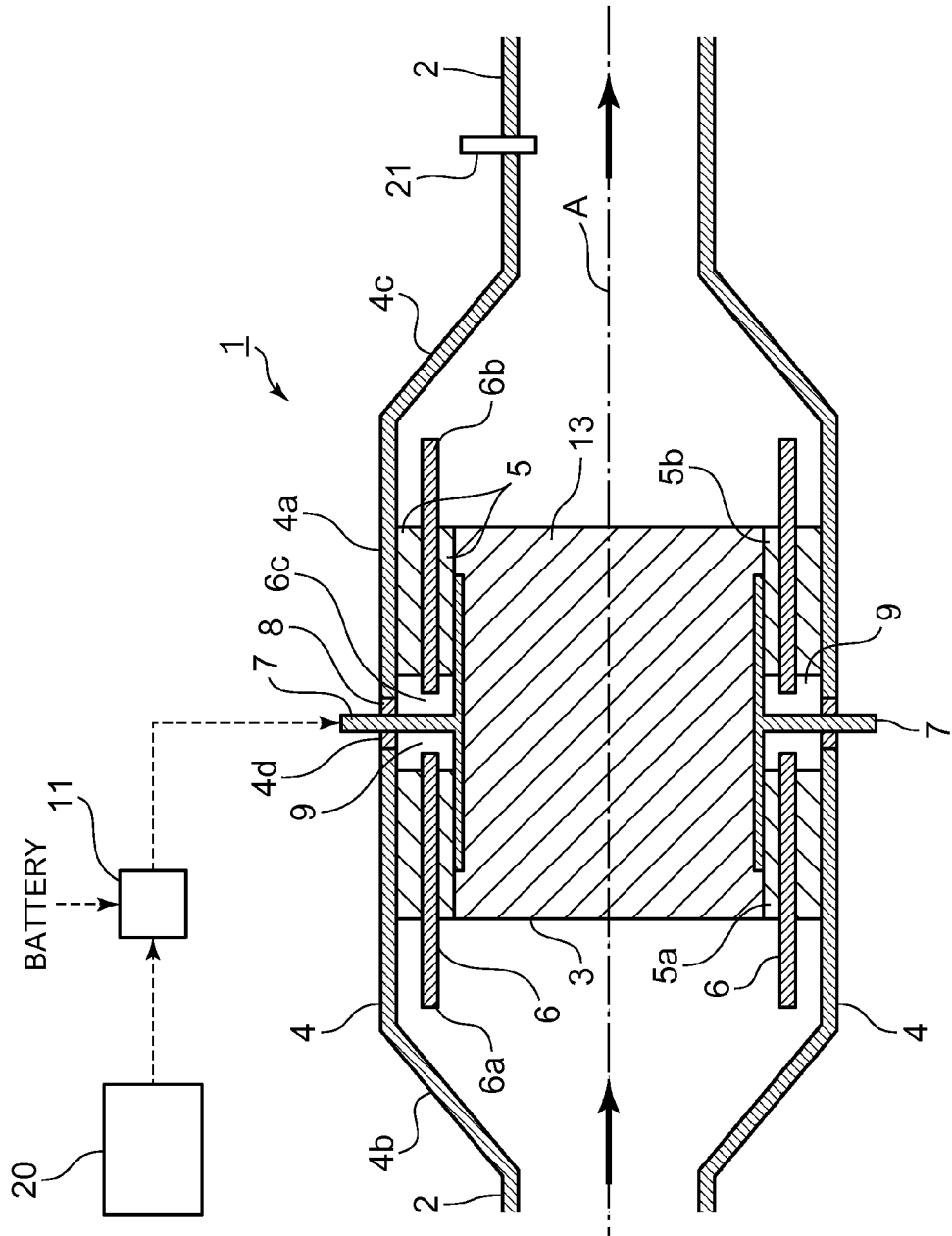
FIG. 1 is a diagram showing a general configuration of an EHC and its control system in a first embodiment.

FIG. 1 is a diagram showing a general configuration of an EHC and its control system in this embodiment. FIG. 1 is a cross-sectional view of the EHC through the central axis.

An EHC 1 in this embodiment is provided in the exhaust pipe of an internal combustion engine installed on a vehicle. The internal combustion engine is a gasoline engine the air-fuel ratio of which is controlled at a value near a theoretical air-fuel ratio during driving. The EHC 1 in this embodiment may be used also on a vehicle that uses a hybrid system having an electric motor. The arrow in FIG. 1 indicates the direction in which an exhaust gas flows in the exhaust pipe.

The EHC 1 in this embodiment includes a catalyst carrier 3, a case 4, a mat 5, an inner tube 6, and an electrode 7. The catalyst carrier 3, cylindrical in shape, is installed so that its central axis and the central axis A of an exhaust pipe 2 are the same. The catalyst carrier 3 carries an exhaust gas purification catalyst 13. An example of the exhaust gas purification catalyst 13 is an oxidation catalyst, an occlusion reduction type NOx catalyst, a selective reduction type NOx catalyst, or a three-way catalyst.

The catalyst carrier 3 is formed of a material that acts as an electric resistor and generates heat when electrically conducted. An example of the material of the catalyst carrier 3 is SiC. The catalyst carrier 3 extends into the exhaust gas flow direction (that is, in the direction of central axis A). In addition, the cross section of the catalyst carrier 3, vertical to the exhaust gas flow direction, has a plurality of honeycomb shaped passages. An exhaust gas circulates through this passage. The cross sectional shape of the catalyst carrier 3, viewed from the direction at right angles to the central axis A, may be elliptic. The central axis A is a central axis common to the exhaust pipe 2, catalyst carrier 3, inner tube 6, and case 4.

The catalyst carrier 3 is stored in the case 4. An electrode chamber 9 is formed in the case 4. The detail of the electrode chamber 9 will be described later. A pair of electrodes 7 is connected to the catalyst carrier 3, from the left and right directions, via the electrode chamber 9. Electricity is supplied from a battery to the electrode 7 via an electric supply control unit 11. When electricity is supplied to the electrode 7, the catalyst carrier 3 is electrically conducted. When the catalyst carrier 3 is heated by the electric conduction, the exhaust gas purification catalyst 13, carried by the catalyst carrier 3, is heated and its activation is promoted.

The case 4 is formed of metal. An example of a material used to form the case 4 is a stainless steel material. The case 4 has two types of part: one is a storing part 4a configured by including a curved surface parallel to the central axis A, and the other is tapered parts 4b and 4c each of which connects the storing part 4a and the exhaust pipe 2 on the upstream side or the downstream side of the storing part 4a. The storing part 4a, with a passage cross-sectional area larger than that of the exhaust pipe 2, stores the catalyst carrier 3, mat 5, and inner tube 6 in its inside. Each of the tapered parts 4b and 4c has a tapered shape, meaning that its passage-sectional area becomes smaller as the distance from the storing part 4a becomes larger.

The mat 5 is sandwiched between the inner wall surface of the storing part 4a of the case 4 and the outer peripheral surface of the catalyst carrier 3. That is, in the case 4, the catalyst carrier 3 is supported by the mat 5. In addition, the inner tube 6 is sandwiched in the mat 5. The inner tube 6 is a tube-shaped member with its center being the central axis A.

Because the inner tube 6 is sandwiched in the mat 5, the mat 5 is divided by the inner tube 6 into mat 5 on the case 4 side and mat 5 on the catalyst carrier 3 side.

The mat 5 is formed of an electric insulator. An example of a material used to form the mat 5 is a ceramic fiber the main component of which is alumina. The mat 5 is wound on the outer peripheral surface of the catalyst carrier 3 and on the outer peripheral surface of the inner tube 6. The mat 5 is divided into an upstream side part 5a and a downstream side part 5b, with a space formed between the upstream side part 5a and the downstream side part 5b. The mat 5, which is sandwiched between the catalyst carrier 3 and the case 4, prevents electricity from flowing to the case 4 when the catalyst carrier 3 is electrically conducted.

The inner tube 6 is formed of a stainless steel material. An electric insulating layer is formed on the whole surface of the inner tube 6. An example of a material used to form the electric insulating layer is ceramic or glass. The main body of the inner tube 6 may be formed of an electric insulator such as alumina.

As shown in FIG. 1, the inner tube 6 is longer than the mat 5 in the direction of the central axis A. Therefore, the end of the upstream side and the end of the downstream side of the inner tube 6 stick out from the end of the upstream side and from the end of the downstream side of the mat 5, respectively. In the description below, parts 6a and 6b of the inner tube 6, which stick out from the end of the mat 5 into the exhaust gas, are called "stuck-out parts".

Through holes 4d and 6c are opened in the case 4 and the inner tube 6 to allow the electrode 7 to pass through. In the case 4, the electrode chamber 9 is formed by a space between the upstream side part 5a and the downstream side part 5b of the mat 5. That is, in this embodiment, the electrode chamber 9 is formed along the whole circumference of the outer peripheral surface of the catalyst carrier 3 between the upstream side part 5a and the downstream side part 5b of the mat 5. Instead of dividing the mat 5 into the upstream side part 5a and the downstream side part 5b, it is also possible to form a space, which acts as the electrode chamber, by opening a through hole only in the part through which the electrode 7 of the mat 5 passes.

An electrode supporting member 8, which supports the electrode 7, is provided in the through hole 4d opened in the case 4. The electrode supporting member 8, formed of an electric insulator, is provided between the case 4 and the electrode 7 with no gap between them.

In the exhaust pipe 2 or in the case 4 of the EHC 1, moisture in the exhaust gas is condensed at cold start time of the internal combustion engine and, as a result, condensed water is generated. When condensed water, generated in the exhaust pipe 2 or in the case 4, flows on the inner wall surface of the case 4 and reaches the mat 5, the condensed water sometimes enters (soaks) the mat 5. In some cases, the water entering the mat 5 in the form of vapor is condensed in the mat 5.

To address this problem, the EHC 1 in this embodiment is configured to sandwich the inner tube 6, the whole surface of which is covered with an electric insulating layer, in the mat 5. This configuration prevents condensed water in the mat 5 from causing a short circuit between the catalyst carrier 3 and the case 4. In addition, the stuck-out parts 6a and 6b of the inner tube 6 prevent condensed water from flowing on the end surface of the mat 5 to the catalyst carrier. Therefore, this configuration also prevents a short-circuit between the catalyst carrier 3 and the case 4 that may be caused by condensed water flowing on the end surface of the mat 5.

In this embodiment, the inner tube 6 need not always stick out from both the upstream side and the downstream side of the mat 5. For example, a configuration is also possible in which the stuck-out part of the inner tube 6 is formed only in the upstream side where more condensed water is generated. The inner tube 6 need not always be sandwiched in the mat 5. For example, the inner tube 6 may also be provided so that it is sandwiched between the case 4 and the mat 5.

The electric supply control unit 11 turns on or off the supply (that is, electric conduction to the catalyst carrier 3) of electricity to the electrode 7 and adjusts the amount of electric conduction. The electric supply control unit 11 is electrically connected to an electronic control unit (ECU) 20 provided also in the internal combustion engine 1. The electric supply control unit 11 is controlled by the ECU 20.

In this embodiment, a temperature sensor 21 is provided in the exhaust pipe 2 on the downstream side of the EHC 1. The temperature sensor 21 detects the temperature of the exhaust gas exhausted from the EHC 1. The temperature sensor 21 is electrically connected to the ECU 20. The detection value of the temperature sensor 21 is input to the ECU 20.

[Electric Conduction Control after the Operation of the Engine is Stopped]

When the inner tube 6 is configured as described above, the stuck-out parts 6a and 6b of the inner tube 6 are exposed to an exhaust gas. Therefore, a conductive PM, included in the exhaust gas, adheres to the stuck-out parts 6a and 6b of the inner tube 6. As a result, when the PM deposits on the end surface of the mat 5 and on the stuck-out part 6a (or 6b) of the inner tube 6, the PM may cause a short circuit between the catalyst carrier 3 and the case 4.

If the exhaust gas includes sufficient oxygen and, in addition, the temperature of the stuck-out parts 6a and 6b of the inner tube 6 rises to the temperature at which a PM can be oxidized, a PM deposited on the stuck-out parts 6a and 6b are oxidized and removed. However, in this embodiment, the air-fuel ratio of the internal combustion engine is controlled at a value near the theoretical air-fuel ratio as described above during the operation of the internal combustion engine. This means that, during the operation of the internal combustion engine, the amount of oxygen in the exhaust gas is insufficient. Therefore, even if the temperature of the stuck-out parts 6a and 6b of the inner tube 6 rises, it is difficult to oxidize a PM deposited on the stuck-out parts 6a and 6b.

To solve this problem, the catalyst carrier 3, or EHC 1, is electrically conducted, in this embodiment after the operation of the internal combustion engine is stopped. By doing so, the temperature of the stuck-out parts 6a and. 6b of the inner tube 6 is increased to the temperature at which a PM can be oxidized. After the operation of the internal combustion engine is stopped, the exhaust gas includes sufficient oxygen. Therefore, after the operation of the internal combustion engine is stopped, the temperature of the stuck-out parts 6a and 6b of the inner tube 6 is increased to the temperature at which a PM can be oxidized so that the PM, deposited on the stuck-out parts 6a and 6b, can be oxidized and removed. This can prevent a PM-caused short circuit between the catalyst carrier 3 and the case 4 in the EHC 1.

Figure 2:
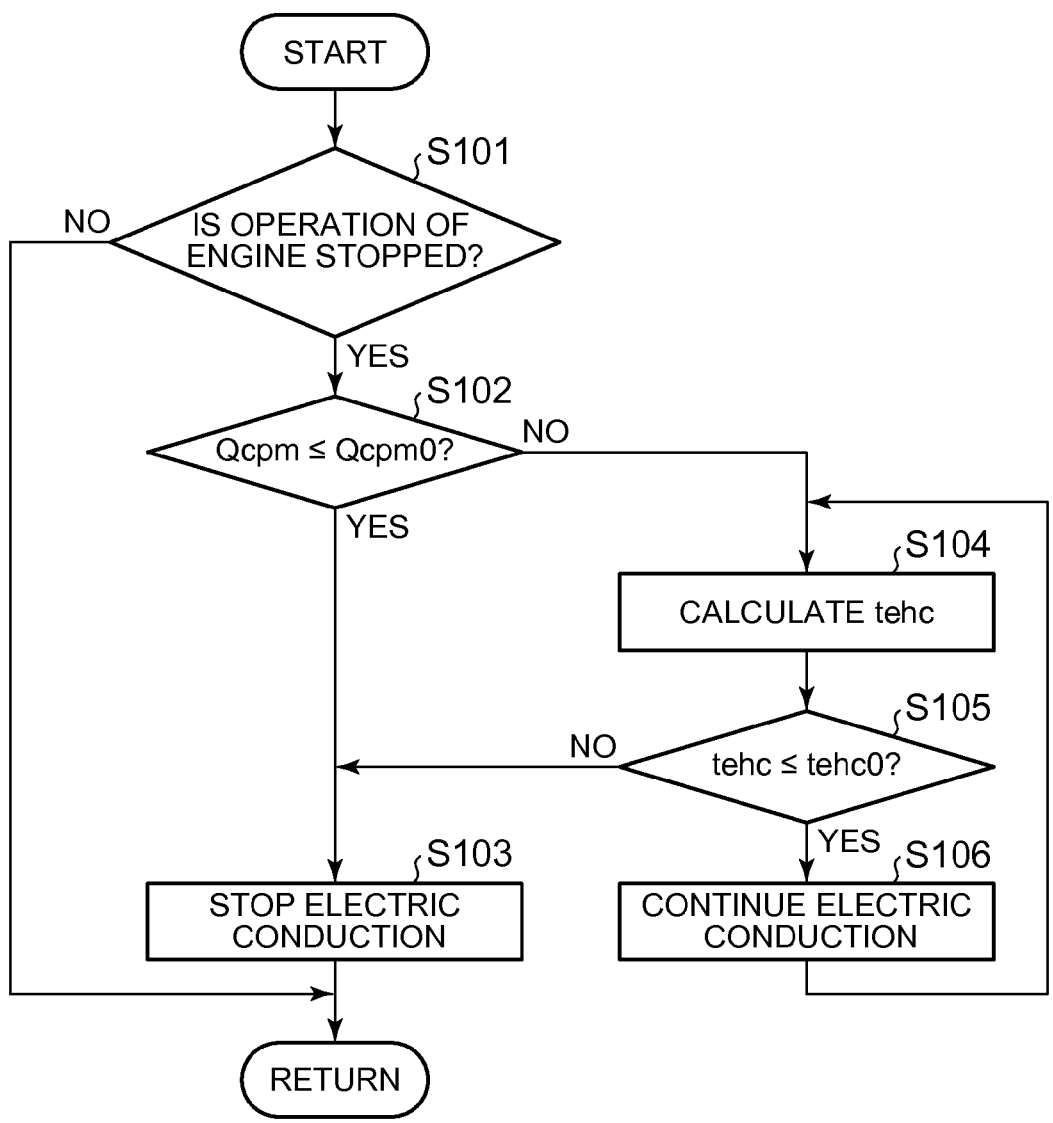
FIG. 2 is a flowchart showing a flow of electric conduction control after an operation of an internal combustion engine is stopped in the first embodiment.

The electric conduction control flow in this embodiment, which is performed after the operation of the internal combustion engine is stopped, is described below with reference to the flowchart in FIG. 2. This flow is stored in the ECU 20 in advance, and the ECU 20 repeatedly executes this flow. In this flow, it is assumed that the EHC 1 is electrically conducted when the operation of the internal combustion engine is stopped.

In this flow, the ECU 20 first determines in step S101 whether the ignition is off and the operation of the internal combustion engine is stopped. The operation stop of the internal combustion engine refers to the stop of fuel injection in the internal combustion engine. Therefore, even if the engine rotation still continues by inertial force immediately after fuel injection in the internal combustion engine is stopped, the ECU 20 determines in step S101 that the operation of the internal combustion engine has been stopped.

If the ECU 20 determines negatively in step S101, that is, if the operation of the internal combustion engine is continued, the execution of this flow is once terminated. On the other hand, if the ECU 20 determines affirmatively in S101, the processing of step S102 is executed next.

In step S102, the ECU 20 determines whether the PM deposit amount Qcpm on the stuck-out parts 6a and 6b of the inner tube 6 at the current time, that is, when the operation of the internal combustion engine is stopped, is equal to or smaller than a predetermined amount Qcpm0. The predetermined amount Qcpm0 refers to an amount equal to or smaller than the threshold of the PM deposit amount with which it can be determined that a short circuit will not be generated between the catalyst carrier 3 and the case 4. This predetermined amount Qcpm0 is determined in advance based on an experiment.

The PM deposit amount Qcpm on the stuck-out parts 6a and 6b of the inner tube 6 can be estimated during the operation of the internal combustion engine according to a known method. For example, the PM amount adhering to the stuck-out parts 6a and 6b of the inner tube 6 is proportional to the PM amount exhausted from the internal combustion engine. Therefore, the PM deposit amount Qcpm on the stuck-out parts 6a and 6b of the inner tube 6 may be calculated by adding up the values generated by multiplying the PM amount, exhausted from the internal combustion engine, by a predetermined coefficient.

Figure 3:
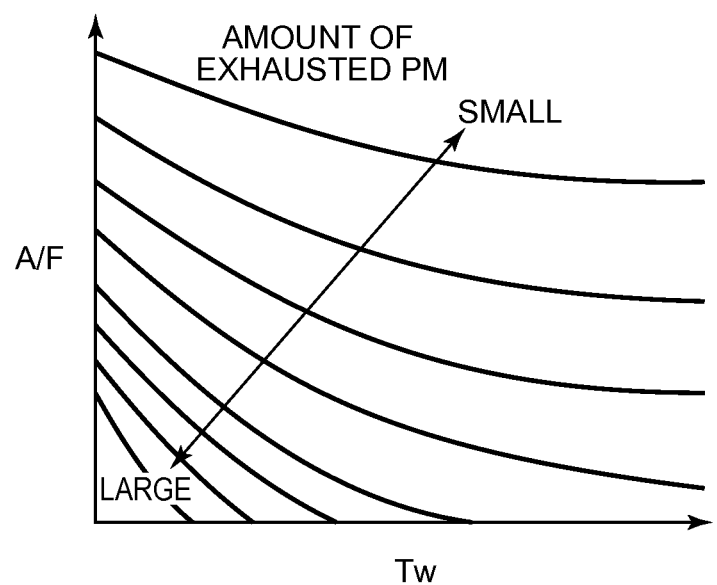
FIG. 3 is a diagram showing a relation among the air-fuel ratio A/F of an air fuel mixture in an internal combustion engine, a cooling water temperature Tw, and a PM amount exhausted from the internal combustion engine.

The PM amount exhausted from the internal combustion engine varies according to the operation state of the internal combustion engine. FIG. 3 is a diagram showing the relation among the air-fuel ratio A/F of the air fuel mixture in the internal combustion engine, the cooling water temperature Tw, and the PM amount exhausted from the internal combustion engine. That is, the lower the air-fuel ratio A/F of the air fuel mixture in the internal combustion engine is and the lower the cooling water temperature Tw of the internal combustion engine is, the larger the PM amount exhausted from the internal combustion engine is. Therefore, the PM amount exhausted from the internal combustion engine can be calculated based on the operation state of the internal combustion engine.

A PM deposits on the upstream side stuck-out part 6a of the inner tube 6 more easily than on the downstream side stuck-out part 6b of the inner tube 6. This means that the PM deposit amount on the upstream side stuck-out part 6a of the inner tube 6 may be calculated during the operation of the internal combustion engine. In step S102, the ECU 20 may determine whether the PM deposit amount on the upstream side stuck-out part 6a is larger than the predetermined amount Qcpm0.

If the ECU 20 determines affirmatively in step S102; the processing of step S103 is executed next. In step S103, electric conduction to the EHC 1 is stopped. On the other hand, if the ECU 20 determines negatively in step S102, that is, if the PM deposit amount Qcpm on the stuck-out parts 6a and 6b of the inner tube 6 when the operation of the internal combustion engine is stopped is larger than the predetermined amount Qcpm0, the processing of step S104 is executed next. In step S104, the ECU 20 calculates the electric conduction time tehc during which the EHC 1 is conducted from the time the operation of the internal combustion engine was stopped to this point in time (that is, elapsed time of electric conduction to the EHC 1 after the operation of the internal combustion engine was stopped).

Next, in step S105, the ECU 20 determines whether the electric conduction time tehc of the EHC 1 after the operation of the internal combustion engine was stopped, calculated in step S104, is equal to or smaller than the predetermined electric conduction time tehc0. The predetermined electric conduction time tehc0 is an allowable time of electric conduction to the EHC 1 after the operation of the internal combustion engine was stopped. The predetermined electric conduction time tehc0 is a time predefined based on an experiment.

If the ECU 20 determines affirmatively in step S105, the processing of step S106 is executed next. In step S106, electric conduction to the EHC 1 is continued. After that, the processing of step S104 and S105 is executed again. On the other hand, if the ECU 20 determines negatively in step S105, electric conduction to the EHC 1 is stopped next in step S103.

According to the above flow, if the PM deposit amount on the stuck-out parts 6a and 6b of the inner tube 6 is larger than the predetermined amount when the operation of the internal combustion engine is stopped, electric conduction to the EHC 1 is continued. This allows the stuck-out parts 6a and 6b of the inner tube 6 to be heated when the exhaust gas includes sufficient oxygen. As a result, the PM deposited on the stuck-out parts 6a and 6b of the inner tube 6 can be oxidized and removed.

In addition, according to the above flow, if the PM deposit amount on the stuck-out parts 6a and 6b of the inner tube 6 when the operation of the internal combustion engine is stopped is equal to or smaller than the predetermined amount, electric conduction to the EHC 1 is inhibited. This prevents unnecessary electric conduction to the EHC 1. This also results in a reduction in the consumption of the battery quantity, thus preventing fuel efficiency from being decreased.

In the flow described above, the control of electric conduction to the EHC 1 is performed when the ignition is turned off and, as a result, the operation of the internal combustion engine is stopped. Electric conduction control to the EHC 1 may also be performed similarly when fuel injection in the internal combustion engine is stopped, for example, when the vehicle is decelerated (the so-called fuel cut control).

Electric conduction to the EHC 1 after the operation of the internal combustion engine is stopped and electric conduction to the EHC 1 during the operation of the internal combustion engine need not always be performed in succession. In other words, it is also possible to once stop electric conduction to the EHC 1 when the operation of the internal combustion engine is stopped and, after a predetermined time has elapsed, to start electric conduction to the EHC 1 to heat the stuck-out parts 6a and 6b of the inner tube 6. In addition, when the operation of the internal combustion engine is stopped while the EHC 1 is not electrically conducted, it is also possible to start electric conduction to the EHC 1 to heat the stuck-out parts 6a and 6b of the inner tube 6 beginning at the time the operation of the internal combustion engine is stopped.

In this embodiment, the catalyst carrier 3 corresponds to the heating element in the present invention. However, the heating element in the present invention is not limited to the carrier that carries the catalyst. For example, the heating element may be a structure provided in the upstream side of the catalyst. In this embodiment, the case 4 corresponds to the case in the present invention. In this embodiment, the mat 5 and the inner tube 6 correspond to the insulating member in the present invention. In this embodiment, the stuck-out parts 6a and 6b of the inner tube 6 correspond to the end of the insulating member in the present invention.

The present invention is applicable also to an EHC in which the inner tube 6 in this embodiment is not provided. Even when no inner tube is provided, the end surface of the mat is exposed to an exhaust gas and, therefore, a PM may deposit on the end surface of the mat. A PM, which deposits on the end surface of the mat, may cause a short circuit between the catalyst carrier 3 and the case 4. To address this problem, electric conduction control, which is performed in this embodiment after the operation of the internal combustion engine is stopped, is performed also in this configuration. Electric conduction, which is performed in this way, can heat the end surface of the mat when the exhaust gas includes sufficient oxygen. Therefore, a PM deposited on the end surface of the mat can be oxidized and removed.

[Modification]

Figure 4:
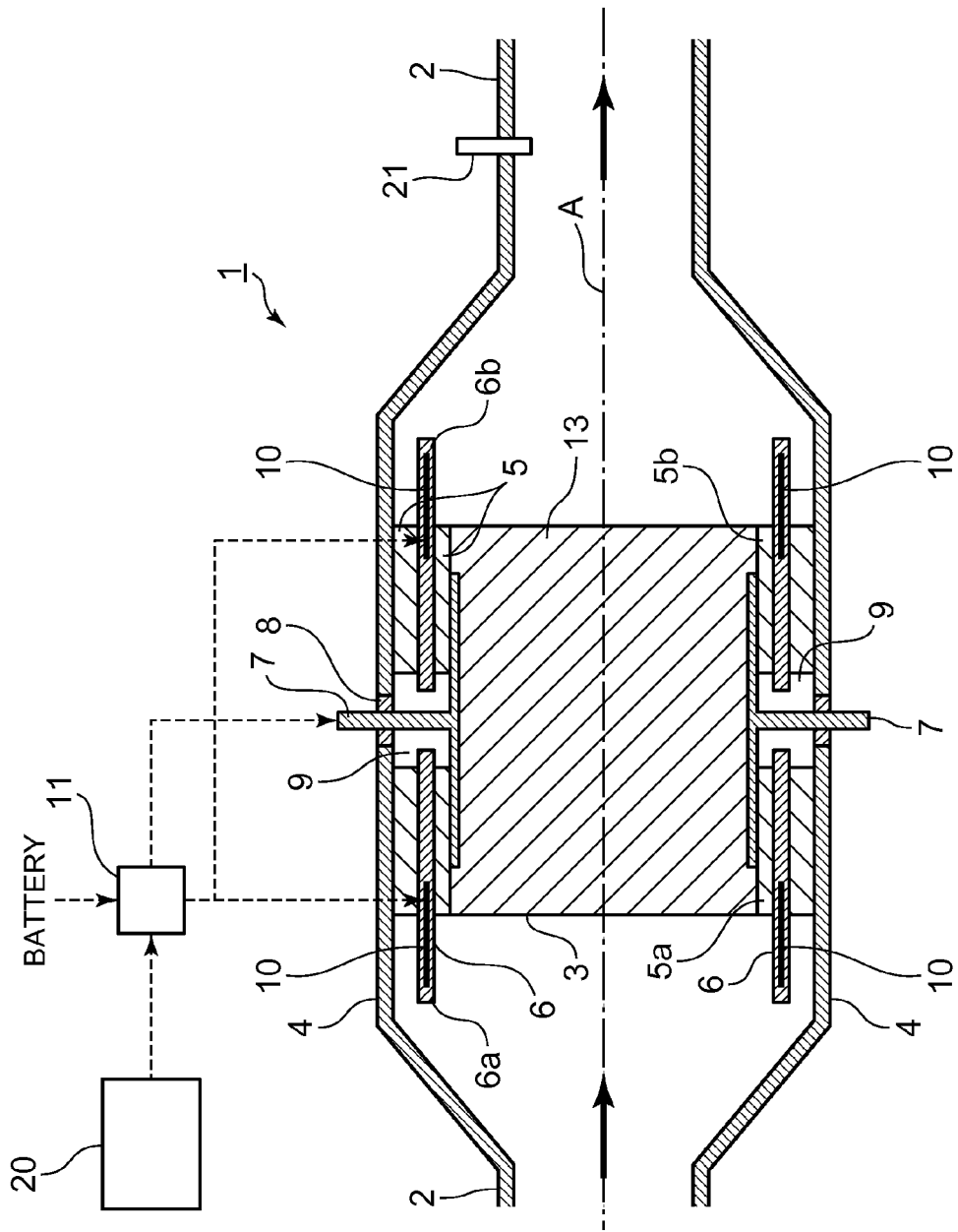
FIG. 4 is a diagram showing a general configuration of an EHC and its control system in a modification of the first embodiment.

FIG. 4 is a diagram showing the general configuration of an EHC and its control system in a modification of this embodiment. In this modification, an inner tube heater 10 is embedded in the stuck-out parts 6a and 6b of the inner tube 6 and in its neighboring part. The inner tube heater 10 is an electric heater for heating the stuck-out parts 6a and 6b of the inner tube 6. The inner tube heater 10 is activated when electricity is supplied from the battery via the electric supply control unit 11.

The inner tube heater 10 may be sandwiched between the inner tube 6 and the mat 5 or may be embedded in the mat 5. Even when the inner tube heater 10 is provided on the mat 5 side, the stuck-out parts 6a and 6b of the inner tube 6 can be heated through heat conduction by activating the inner tube heater 10. The inner tube heater 10 need not always be provided on both the upstream side stuck-out part 6a and the downstream side stuck-out part 6b of the inner tube 6. For example, the inner tube heater 10 may be provided only on the upstream side stuck-out part 6a where a PM deposits more easily.

Electricity can be supplied to the inner tube, heater 10 through the electric supply control unit 11 via a path different from that for supplying electricity to the electrode 7. Therefore, regardless of whether electricity is supplied to the electrode 7, that is, whether the catalyst carrier 3 is electrically conducted, the stuck-out parts 6a and 6b of the inner tube 6 can be heated by the inner tube heater 10.

In this modification, the above-described control of electric conduction to the EHC 1 is performed as the control of electric conduction to the inner tube heater 10. In other words, instead of electrically conducting the EHC 1 (electrically conducting the catalyst carrier 3), the inner tube heater 10 is electrically conducted after the operation of the internal combustion engine 1 is stopped. This electric conduction also heats the stuck-out parts 6a and 6b of the inner tube 6 when the exhaust gas includes sufficient oxygen. As a result, a PM deposited on the stuck-out parts 6a and 6b of the inner tube 6 can be oxidized and removed.

If the amount of PM, deposited on the stuck-out parts 6a and 6b of the inner tube 6, is equal to or smaller than a predetermined amount when the operation of the internal combustion engine is stopped, electric conduction to the inner tube heater 10 is inhibited. This prevents unnecessary electric conduction to the inner tube heater 10.

Instead of the inner tube heater, a heater for heating the end surface of the mat 5 may also be provided. In this case, too, similar electric conduction control is performed.

Second Embodiment

The general configuration of an EHC and its control system in this embodiment is similar to that of the EHC and its control system in the first embodiment. The following describes only the difference between this embodiment and the first embodiment in electric conduction control that is performed after the operation of the internal combustion engine is stopped.

[Electric Conduction Control after the Operation of the Engine is Stopped]

If the temperature of the EHC 1 is high to some extent when the operation of the internal combustion engine is stopped and oxygen is supplied because the operation of the internal combustion engine is stopped, a PM, deposited on the stuck-out parts 6a and 6b of the inner tube 6, is oxidized without having to heat the stuck-out parts 6a and 6b by electrically conducting the EHC 1. Considering this, if the temperature of the EHC 1 is equal to or higher than a first predetermined temperature when the operation of the internal combustion engine is stopped, electric conduction to the EHC 1 is inhibited in this embodiment after the operation of the internal combustion engine is stopped.

Here, the first predetermined temperature refers to a temperature equal to or higher than a temperature threshold at which a PM, deposited on the stuck-out parts 6a and 6b of the inner tube 6, can be oxidized. This first predetermined temperature is defined in advance based on an experiment.

Conversely, if the temperature of the EHC 1 is very low when the operation of the internal combustion engine is stopped, it is difficult to increase the temperature of the stuck-out parts 6a and 6b of the inner tube 6 to a temperature at which a PM, deposited on the stuck-out parts 6a and 6b, is sufficiently oxidized even if the EHC 1 is electrically conducted after the operation of the internal combustion engine is stopped. To address this problem, if the temperature of the EHC 1 is equal to or lower than a second predetermined temperature when the operation of the internal combustion engine is stopped, electric conduction to the EHC 1 is inhibited in this embodiment after the operation of the internal combustion engine is stopped.

Here, the second predetermined temperature refers to a temperature equal to or lower than a temperature threshold at which it is difficult to increase the temperature of the stuck-out parts 6a and 6b of the inner tube 6 to a temperature at which a PM, deposited on the stuck-out parts 6a and 6b, is sufficiently oxidized even if the EHC 1 is electrically conducted. This second predetermined temperature is defined in advance based on an experiment.

Figure 5:
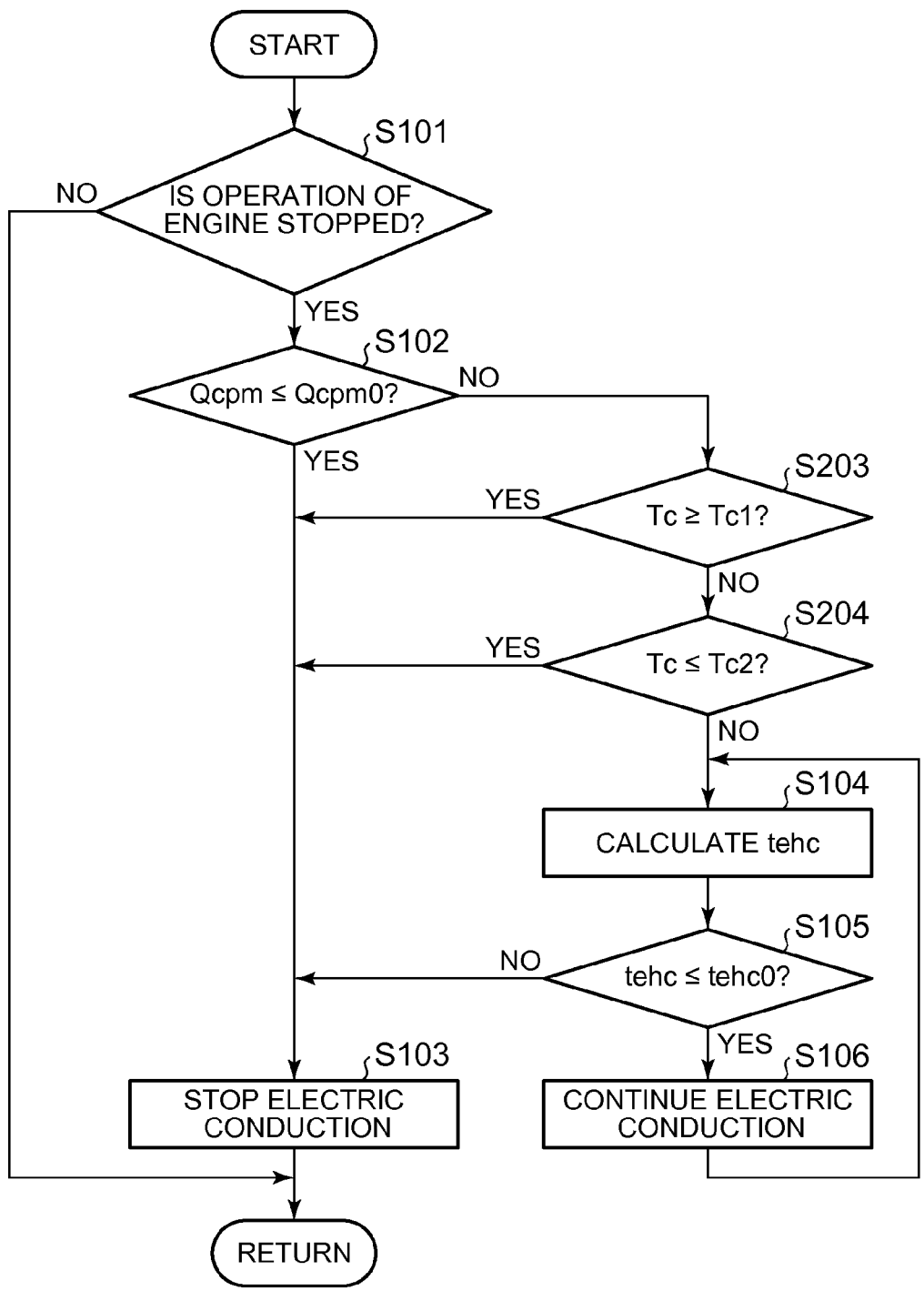
FIG. 5 is a flowchart showing a flow of electric conduction control after an operation of an internal combustion engine is stopped in a second embodiment.

The electric conduction control flow in this embodiment, which is performed after the operation of the internal combustion engine is stopped, is described below with reference to the flowchart shown in FIG. 5. This flow is stored in the ECU 20 in advance, and the ECU 20 repeatedly executes this flow. In this flow, it is assumed that the EHC 1 is electrically conducted when the operation of the internal combustion engine is stopped. For a step in this flow in which the processing similar to that of a step in the flow shown in FIG. 2 is executed, the same reference numeral as that in FIG. 2 is used and its description is omitted.

In this flow, if the ECU 20 negatively determines in step S102, the processing of step S203 is executed next. In step S203, the ECU 20 determines whether the temperature Tc of the EHC 1 at the current time, that is, when the operation of the internal combustion engine is stopped, is equal to or higher than a first predetermined temperature Tc1. The temperature of the EHC 1 may be estimated based on the exhaust gas temperature detected by the temperature sensor 21 or the temperature of the exhaust gas exhausted from the internal combustion engine.

If the ECU 20 determines affirmatively in step S203, electric conduction to the EHC 1 is stopped next in step S103. On the other hand, if the ECU 20 determines negatively in step S203, the processing of step S204 is executed next.

In step S204, the ECU 20 determines whether the temperature Tc of the EHC 1 at the current time, that is, when the operation of the internal combustion engine is stopped, is equal to or lower than a second predetermined temperature Tc2. If the ECU 20 determines affirmatively in step S204, electric conduction to the EHC 1 is stopped next in step S103. On the other hand, if the ECU 20 determines negatively in step S204, the processing of step S104 is executed next.

According to the above-described flow, if the temperature of the EHC 1 is equal to or higher than the first predetermined temperature or equal to or lower than the second predetermined temperature when the operation of the internal combustion engine is stopped, electric conduction to the EHC 1 is inhibited. This prevents unnecessary electric conduction to the EHC 1. This also results in a reduction in the consumption of the battery quantity, thus preventing fuel efficiency from being decreased.

Electric conduction to the EHC 1 need not always be inhibited even if the temperature of the EHC 1 when the operation of the internal combustion engine is stopped is equal to or higher than the first predetermined temperature or is equal to or lower than the second predetermined temperature. That is, it is also possible to inhibit electric conduction to the EHC 1 only in one of these cases.

It is also possible to determine whether to inhibit electric conduction to the EHC 1 based, not on the temperature of the EHC 1, but on the temperature of an exhaust gas correlated with the temperature of the EHC 1 such as the temperature of an exhaust gas detected by the temperature sensor 21 or the temperature of an exhaust gas flowing into the EHC 1.

When the configuration of the EHC and its control system is similar to the configuration used in the modification of the first embodiment, electric conduction to the inner tube heater 10 is inhibited if the temperature of the EHC 1 when the operation of the internal combustion engine is stopped is equal to or higher than the first predetermined temperature or equal to or lower than the second predetermined temperature. This prevents unnecessary electric conduction to the inner tube heater 10.

Similar electric conduction is performed also when a heater, which heats the end surface of the mat 5, is provided instead of the inner tube heater.

Third Embodiment

The general configuration of an EHC and its control system in this embodiment is similar to that of the EHC and its control system in the first embodiment. The following describes only the difference between this embodiment and the first embodiment in electric conduction control that is performed after the operation of the internal combustion engine is stopped.

[Electric Conduction Control after the Operation of the Engine is Stopped]

As described above, if the temperature of the EHC 1 is higher than a predetermined level when the operation of the internal combustion engine is stopped and oxygen is supplied because the operation of the internal combustion engine is stopped, a PM, deposited on the stuck-out parts 6a and 6b of the inner tube 6, is oxidized without having to heat the stuck-out parts 6a and 6b by electrically conducting the EHC 1. Therefore, if the temperature of the EHC 1 is equal to or higher than a first predetermined temperature when the operation of the internal combustion engine is stopped, electric conduction to the EHC 1, which is to be performed after the operation of the internal combustion engine is stopped, is started after a predetermined electric conduction stop period elapses from the time the operation of the internal combustion engine is stopped.

The first predetermined temperature, similar to the first predetermined temperature in the second embodiment, refers to a temperature equal to or higher than a temperature threshold at which a PM, deposited on the stuck-out parts 6a and 6b of the inner tube 6, can be oxidized. This first predetermined temperature is defined in advance based on an experiment. The predetermined electric conduction stop period is a period with which it can be determined that the temperature of the EHC 1 becomes lower than the first predetermined temperature.

Figure 6:
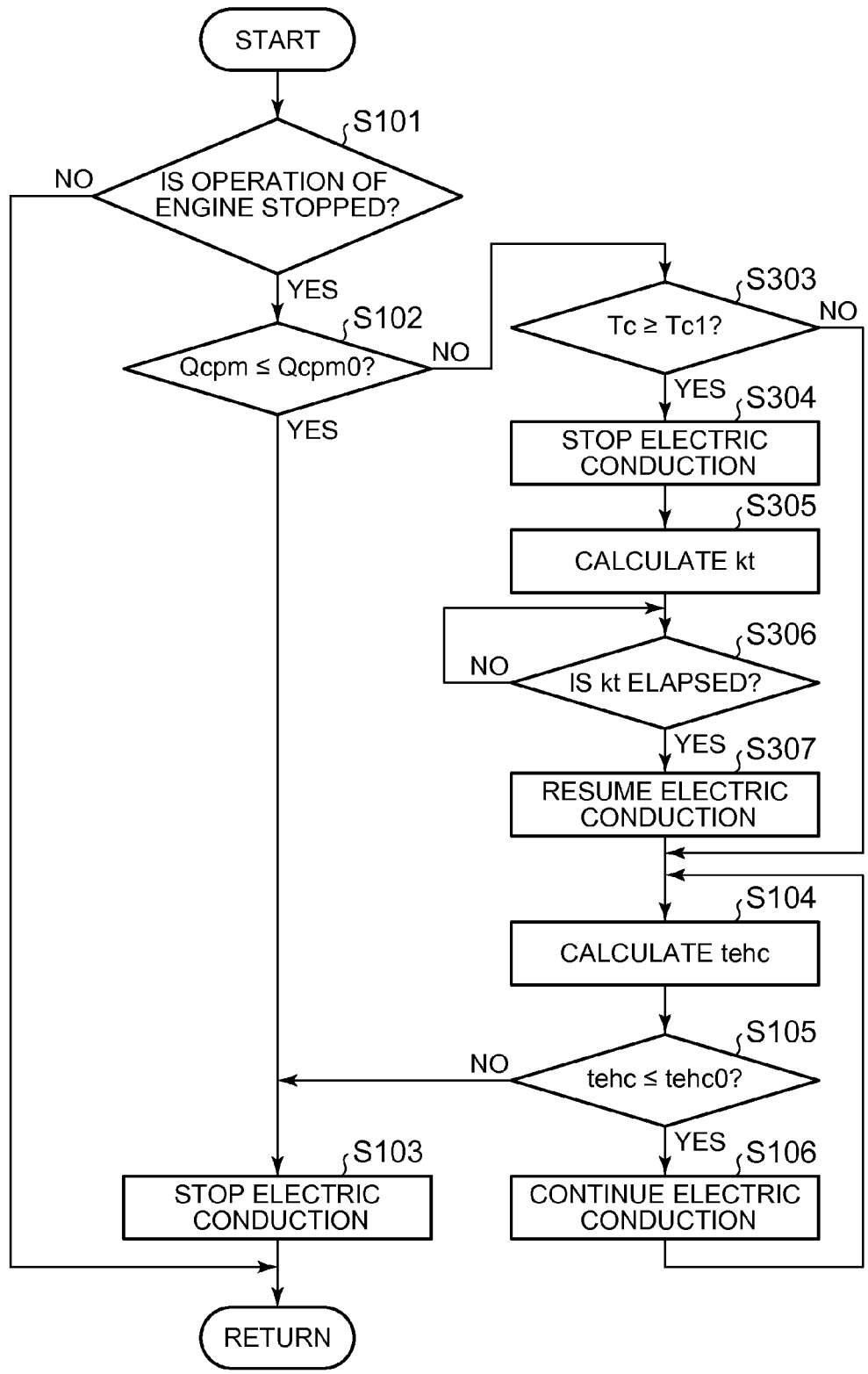
FIG. 6 is a flowchart showing a flow of electric conduction control after an operation of an internal combustion engine is stopped in a third embodiment.

The electric conduction control flow in this embodiment, which is performed after the operation of the internal combustion engine is stopped, is described below with reference to the flowchart in FIG. 6. This flow is stored in the ECU 20 in advance, and the ECU 20 repeatedly executes this flow. In this flow, it is assumed that the EHC 1 is electrically conducted when the operation of the internal combustion engine is stopped. For a step in this flow in which the processing similar to that of a step in the flow shown in FIG. 2 is executed, the same reference numeral as that in FIG. 2 is used and its description is omitted.

In this flow, if the ECU 20 negatively determines in step S102, the processing of step S303 is executed next. In step S303, the ECU 20 determines whether the temperature Tc of the EHC 1 at the current time, that is, when the operation of the internal combustion engine is stopped, is equal to or higher than a first predetermined temperature Tc1. If the ECU 20 determines affirmatively in step S303, the processing of step S304 is executed next. On the other hand, if the ECU 20 determines negatively, the processing of step S104 is executed next.

Figure 7:
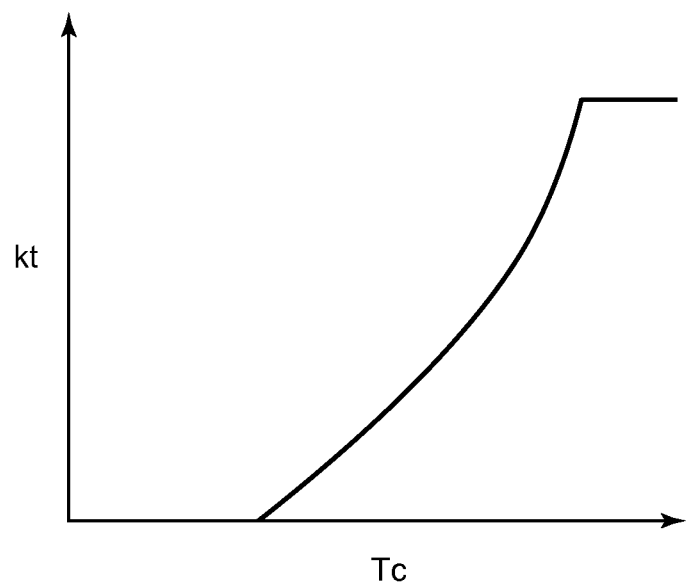
FIG. 7 is a diagram showing a relation in the third embodiment between the temperature Tc of an HC when an operation of an internal combustion engine is stopped and an electric conduction stop period kt.

In step S304, electric conduction to the EHC 1 is once stopped. Next, in step S305, an electric conduction stop period kt is calculated based on the temperature Tc of the EHC 1 when the operation of the internal-combustion engine is stopped. FIG. 7 is a diagram showing the relation in this embodiment between the temperature Tc of the EHC 1 when the operation of the internal combustion engine is stopped and the electric conduction stop period kt. As shown in FIG. 7, the higher is the temperature Tc of the EHC 1 when the operation of the internal combustion engine is stopped, the longer is the electric conduction stop period kt.

The relation between the temperature Tc of the EHC 1 when the operation of the internal combustion engine is stopped and the electric conduction stop period kt, such as that shown in FIG. 7, is stored in advance in the ECU 20 as a map or a function. In step S305, this map or function is used to calculate the electric conduction stop period kt. It is also possible to calculate the electric conduction stop period based, not on the temperature of the EHC 1, but on the temperature of an exhaust gas correlated with the temperature of the EHC 1 such as the temperature of an exhaust gas detected by the temperature sensor 21 or the temperature of an exhaust gas flowing into the EPIC 1.

Next, in step S306, the ECU 20 determines whether the electric conduction stop period kt, calculated in step S304, has elapsed from the time the operation of the internal combustion engine is stopped. If the ECU 20 determines affirmatively in step S306, the processing of step S307 is executed. If the ECU 20 determines negatively, the processing of step S306 is executed again. In step S307, electric conduction to the EHC 1 is resumed.

According to the flow described above, electric conduction to the EHC 1 is stopped while the temperature of the EHC 1 remains high enough to oxidize a PM, deposited on the stuck-out parts 6a and 6b of the inner tube 6, after the operation of the internal combustion engine is stopped. After the temperature of the EHC 1 is decreased, through radiation, to a temperature at which it is difficult to oxidize a PM deposited on the stuck-out parts 6a and 6b of the inner tube 6, electric conduction to the EHC 1 is started. This prevents unnecessary electric conduction to the EHC 1. This also results in a reduction in the consumption of the battery quantity, thus preventing fuel efficiency from being decreased.

In the flow described above, instead of executing steps S305 and S306, it is also possible to acquire the temperature of the EHC 1 after electric conduction to the EHC 1 is stopped and then determine whether the acquired temperature of the EHC becomes lower than the first predetermined temperature. If the temperature of the EHC becomes lower than the first predetermined temperature, electric conduction to the EHC 1 may be resumed.

If the operation of the internal combustion engine is stopped with the EHC 1 not electrically conducted and if the temperature of the EHC 1 when the operation of the internal combustion engine is stopped is equal to or higher than the first predetermined temperature, electric conduction to the EHC 1 remains stopped until the predetermined electric conduction stop period elapses from the time the operation of the internal combustion engine is stopped. When the predetermined electric conduction stop period has elapsed from the time the operation of the internal combustion engine is stopped, the EHC 1 is electrically conducted.

When the configuration of the EHC and its control system is similar to the configuration used in the modification of the first embodiment and the temperature of the EHC 1 at the time the operation of the internal combustion engine is stopped is equal to or higher than the first predetermined temperature, electric conduction to the inner tube heater 10, which is to be performed after the operation of the internal combustion engine is stopped, is started after a predetermined electric conduction stop period elapses from the time the operation of the internal combustion engine is stopped. This prevents unnecessary electric conduction to the inner tube heater 10.

Similar electric conduction is performed also when a heater, which heats the end surface of the mat 5, is provided instead of the inner tube heater.

Fourth Embodiment

The general configuration of an EHC and its control system in this embodiment is similar to that of the EHC and its control system in the first embodiment. The following describes only the difference between this embodiment and the first embodiment in electric conduction control that is performed after the operation of the internal combustion engine is stopped.

[Electric Conduction Control after the Operation of the Engine is Stopped]

The larger the amount of a PM deposited on the stuck-out parts 6a and 6b of the inner tube 6 when the operation of the internal combustion engine is stopped or the lower the temperature of the EHC 1 when the operation of the internal combustion engine is stopped, the larger the amount of energy should be supplied to the EHC 1 through electric conduction after the operation of the internal combustion engine is stopped to oxidize and remove the PM deposited on the stuck-out parts 6a and 6b of the inner tube 6. In other words, the smaller the amount of a PM deposited on the stuck-out parts 6a and 6b of the inner tube 6 when the operation of the internal combustion engine is stopped or the higher the temperature of the EHC 1 when the operation of the internal combustion engine is stopped, the smaller the amount of energy is required to be supplied to the EHC 1 through electric conduction after the operation of the internal combustion engine is stopped to oxidize and remove the PM deposited on the stuck-out parts 6a and 6b of the inner tube 6.

The larger the particulate diameter of a PM deposited on the stuck-out parts 6a and 6b of the inner tube 6, the more difficult it is to oxidize the PM. Therefore, the larger the particulate diameter of a PM deposited on the stuck-out parts 6a and 6b of the inner tube 6, the larger the amount of energy is required to be supplied to the EHC 1 through electric conduction after the operation of the internal combustion engine is stopped to oxidize and remove the PM deposited on the stuck-out parts 6a and 6b of the inner tube 6. In other words, the smaller the particulate diameter of a PM deposited on the stuck-out parts 6a and 6b of the inner tube 6, the smaller the amount of energy is required to be supplied to the EHC 1 through electric conduction after the operation of the internal combustion engine is stopped to oxidize and remove the PM deposited on the stuck-out parts 6a and 6b of the inner tube 6.

With this in mind, the amount of electric conduction per unit time and the electric conduction time, which are used to electrically conduct the EHC 1 after the operation of the internal combustion engine is stopped, are changed in this embodiment according to the following factors: the amount of a PM deposited on the stuck-out parts 6a and 6b of the inner tube 6 when the operation of the internal combustion engine is stopped, the temperature of the EHC 1 at that time, and the particulate diameter of a PM deposited on the stuck-out parts 6a and 6b of the inner tube 6. More specifically, the electric conduction amount and the electric conduction time length are determined as follows.

Figure 8:
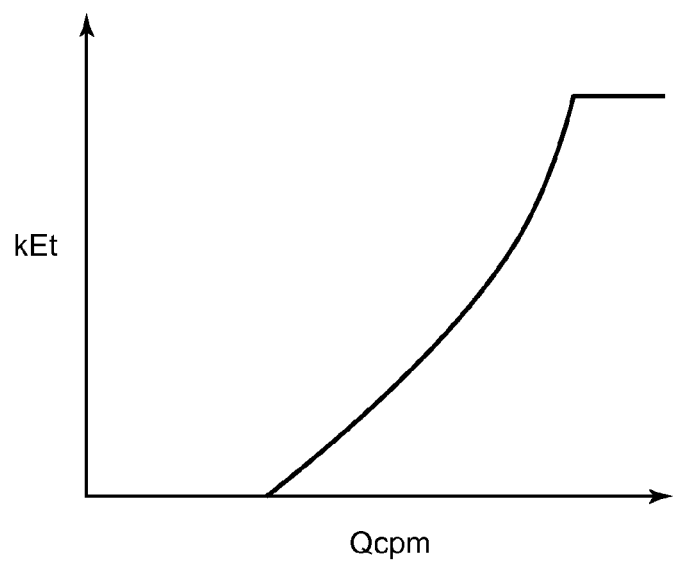
FIG. 8 is a diagram showing a relation in a fourth embodiment between a target amount of electric conduction kEt to an EHC per unit time after an operation of an internal combustion engine is stopped and a PM deposit amount Qcpm on stuck-out parts of an inner tube when the operation of the internal combustion engine is stopped.

FIG. 8 is a diagram showing the relation between the target amount of electric conduction kEt to the EHC 1 per unit time after the operation of the internal combustion engine is stopped and the PM deposit amount Qcpm on the stuck-out parts 6a and 6b of the inner tube 6 when the operation of the internal combustion engine is stopped. As shown in FIG. 8, the larger the PM deposit amount Qcpm on the stuck-out parts 6a and 6b of the inner tube 6 when the operation of the internal combustion engine is stopped, the larger the target amount of electric conduction kEt to the EHC 1 per unit time is set after the operation of the internal combustion engine is stopped.

Figure 9:
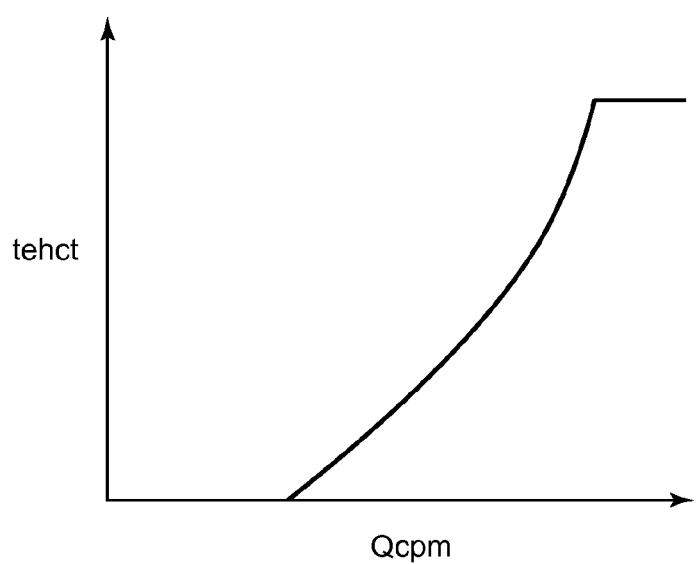
FIG. 9 is a diagram showing a relation in the fourth embodiment between a target time of electric conduction tehct to an EHC after an operation of an internal combustion engine is stopped and a PM deposit amount Qcpm on the stuck-out parts of an inner tube when the operation of the internal combustion engine is stopped.

FIG. 9 is a diagram showing the relation in this embodiment between the target time of electric conduction tehct to the EHC 1 after the operation of the internal combustion engine is stopped and the PM deposit amount Qcpm on the stuck-out parts 6a and 6b of the inner tube 6 when the operation of the internal combustion engine is stopped. As shown in FIG. 9, the larger the PM deposit amount Qcpm on the stuck-out parts 6a and 6b of the inner tube 6 when the operation of the internal combustion engine is stopped, the longer the target time of electric conduction tehct to the EHC 1 is set after the operation of the internal combustion engine is stopped.

Figure 10:
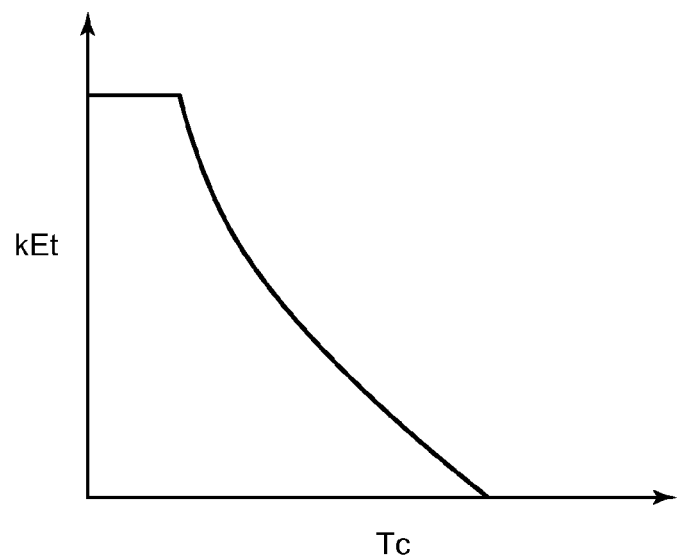
FIG. 10 is a diagram showing a relation in the fourth embodiment between a target amount of electric conduction kEt to an EHC per unit time after an operation of an internal combustion engine is stopped and a temperature Tc of the EHC when the operation of the internal combustion engine is stopped.

FIG. 10 is a diagram showing the relation in this embodiment between the target amount of electric conduction kEt to the EHC 1 per unit time after the operation of the internal combustion engine is stopped and the temperature Tc of the EHC 1 when the operation of the internal combustion engine is stopped. As shown in FIG. 10, the lower the temperature Tc of the EHC 1 when the operation of the internal combustion engine is stopped, the larger the target amount of electric conduction kEt to the EHC 1 per unit time is set after the operation of the internal combustion engine is stopped.

Figure 11:
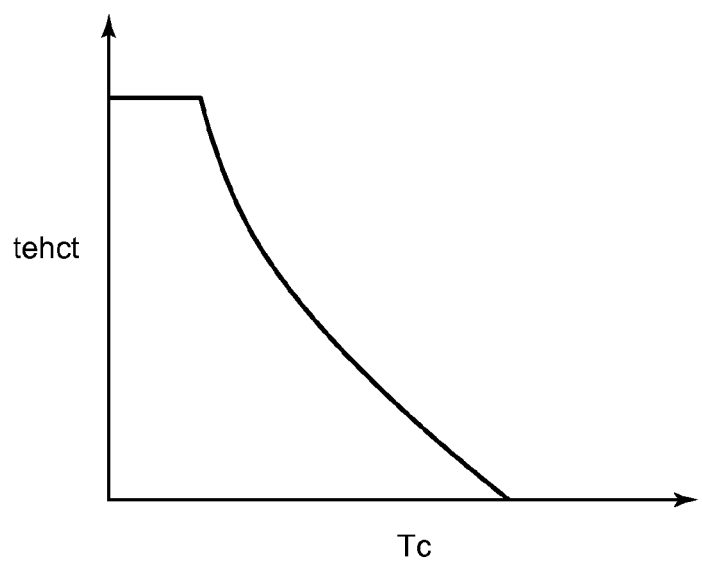
FIG. 11 is a diagram showing a relation in the fourth embodiment between a target time of electric conduction tehct to an EHC after an operation of an internal combustion engine is stopped and a temperature Tc of the EHC when the operation of the internal combustion engine is stopped.

FIG. 11 is a diagram showing the relation in this embodiment between the target time of electric conduction tehct to the EHC 1 after the operation of the internal combustion engine is stopped and the temperature Tc of the EHC 1 when the operation of the internal combustion engine is stopped. As shown in FIG. 11, the lower the temperature Tc of the EHC 1 when the operation of the internal combustion engine is stopped, the longer the target time of electric conduction tehct to the EHC 1 is set after the operation of the internal combustion engine is stopped.

Figure 12:
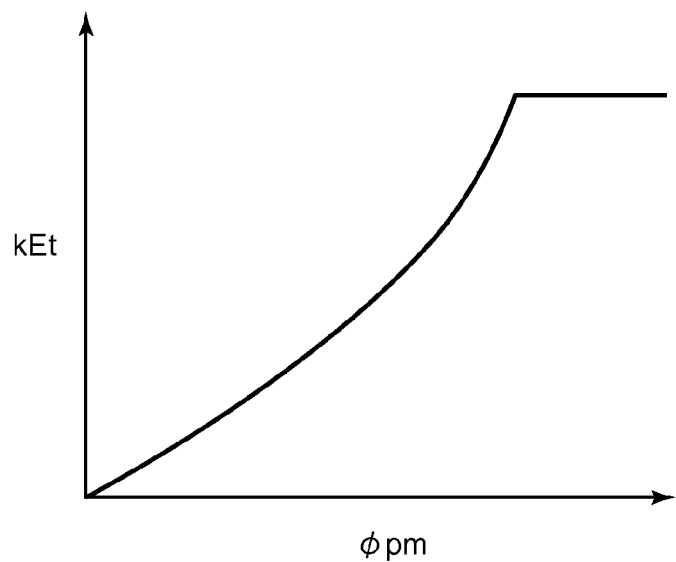
FIG. 12 is a diagram showing a relation in the fourth embodiment between a target amount of electric conduction kEt to an EHC per unit time after an operation of an internal combustion engine is stopped and a particulate diameter φpm of a PM deposited on the stuck-out parts of an inner tube.

FIG. 12 is a diagram showing the relation in this embodiment between the target amount of electric conduction kEt to the EHC 1 per unit time after the operation of the internal combustion engine is stopped and the particulate diameter φpm of a PM deposited on the stuck-out parts 6a and 6b of the inner tube 6. As shown in FIG. 12, the larger the particulate diameter φpm of the PM deposited on the stuck-out parts 6a and 6b of the inner tube 6, the larger the target amount of electric conduction kEt to the EHC 1 per unit time is set after the operation of the internal combustion engine is stopped.

Figure 13:
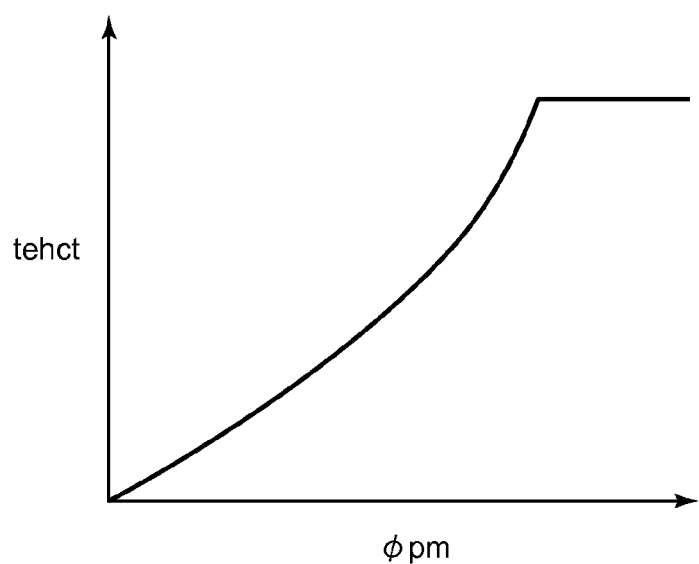
FIG. 13 is a diagram showing a relation in the fourth embodiment between a target time of electric conduction tehct to an EHC after an operation of an internal combustion engine is stopped and a particulate diameter φpm of a PM deposited on the stuck-out parts of an inner tube.

FIG. 13 is a diagram showing the relation in this embodiment between the target time of electric conduction tehct to the EHC 1 after the operation of the internal combustion engine is stopped and the particulate diameter φpm of a PM deposited on the stuck-out parts 6a and 6b of the inner tube 6. As shown in FIG. 13, the larger the particulate diameter φpm of the PM deposited on the stuck-out parts 6a and 6b of the inner tube 6, the longer the target time of electric conduction tehct to the EHC 1 is set after the operation of the internal combustion engine is stopped.

Figure 14:
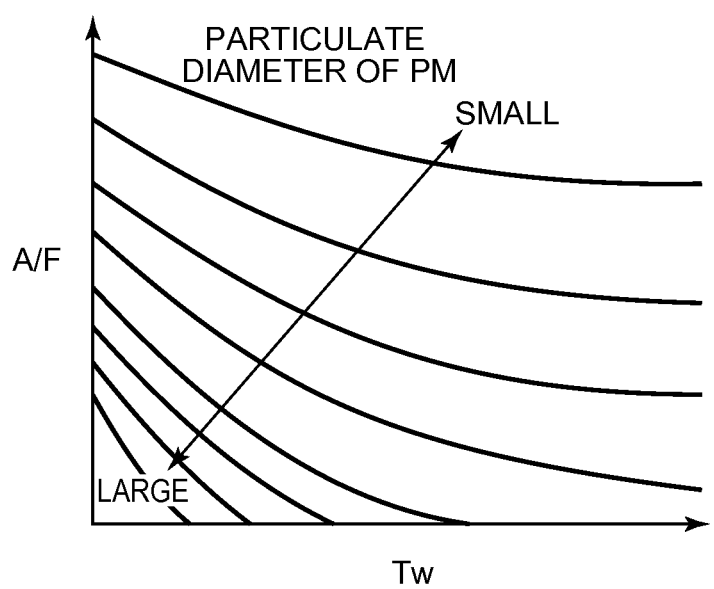
FIG. 14 is a diagram showing a relation among an air-fuel ratio A/F of an air fuel mixture in an internal combustion engine, a cooling water temperature Tw, and a particulate diameter of a PM exhausted from the internal combustion engine.

The particulate diameter of a PM exhausted from the internal combustion engine varies according to the operation state of the internal combustion engine. FIG. 14 is a diagram showing the relation among the air-fuel ratio A/F of the air fuel mixture in the internal combustion engine, the cooling water temperature Tw, and the particulate diameter of a PM exhausted from the internal combustion engine. That is, the lower the air-fuel ratio A/F of the air fuel mixture in the internal combustion engine or the lower the cooling water temperature Tw of the internal combustion engine, the larger the particulate diameter of a PM, exhausted from the internal combustion engine, is. Therefore, the particulate diameter of a PM deposited on the stuck-out parts 6a and 6b of the inner tube 6 can be calculated based on the operation state of the internal combustion engine before the operation of the internal combustion engine is stopped.

Figure 15:
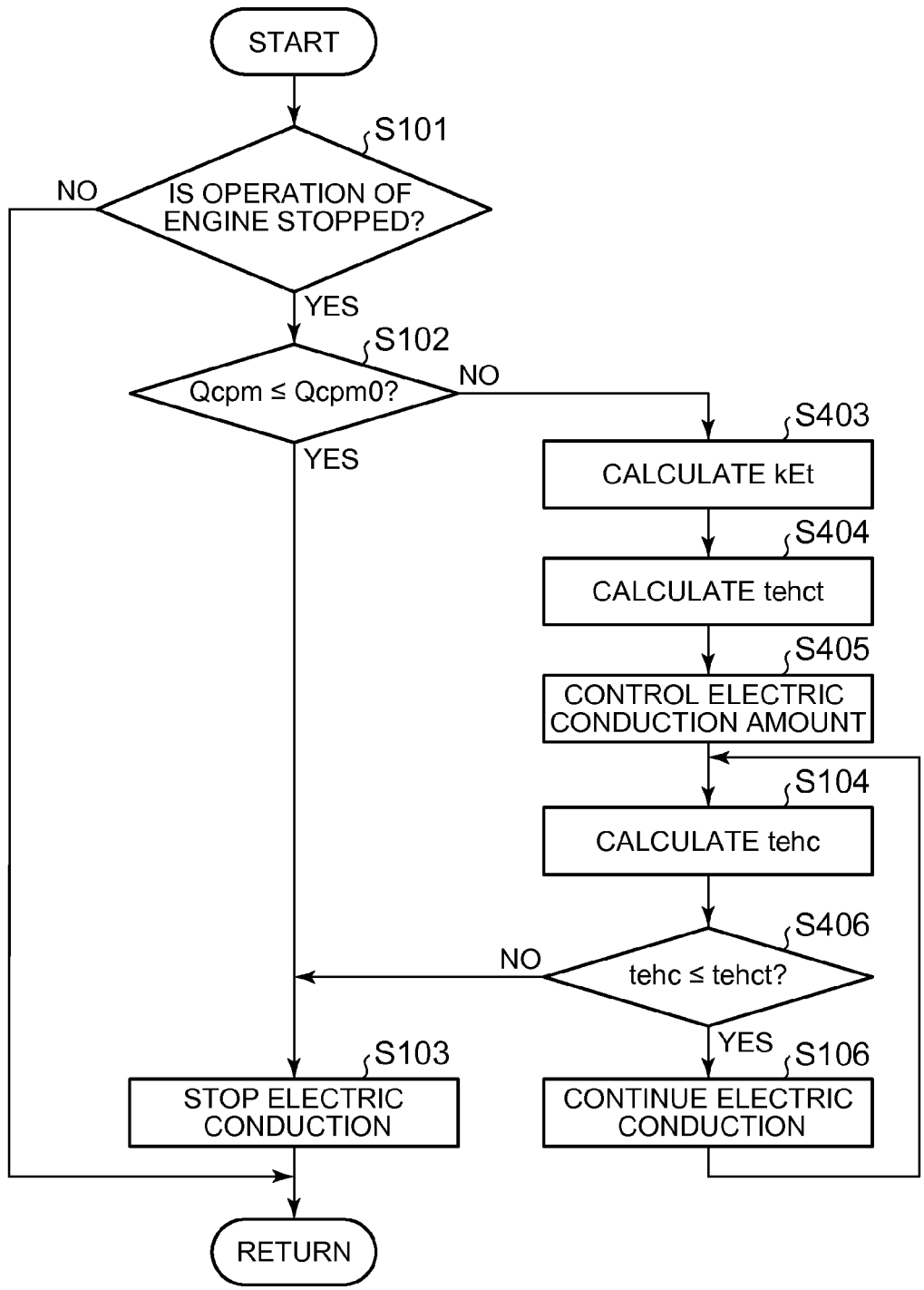
FIG. 15 is a flowchart showing a flow of electric conduction control after an operation of an internal combustion engine is stopped in the fourth embodiment.

The electric conduction control flow in this embodiment, which is performed after the operation of the internal combustion engine is stopped, is described below with reference to the flowchart in FIG. 15. This flow is stored in the ECU 20 in advance, and the ECU 20 repeatedly executes this flow. In this flow, it is assumed that the EHC 1 is electrically conducted when the operation of the internal combustion engine is stopped. For a step in this flow in which the processing similar to that of a step in the flow shown in FIG. 2 is executed, the same reference numeral as that in FIG. 2 is used and its description is omitted.

In this flow, if the ECU 20 determines negatively in step S102, the processing of step S403 is executed next. In step S403, the target amount of electric conduction kEt to the EHC 1 per unit time after the operation of the internal combustion engine is stopped (hereinafter sometimes simply called the target electric conduction amount) is calculated based on the PM deposit amount on the stuck-out parts 6a and 6b of the inner tube 6 when the operation of the internal combustion engine is stopped, the temperature of the EHC 1 at that time, and the particulate diameter of the PM deposited on the stuck-out parts 6a and 6b of the inner tube 6.

In this embodiment, the relations such as those shown in FIGS. 8, 10, and 12, that is, the relation between the PM deposit amount on the stuck-out parts 6a and 6b of the inner tube 6 when the operation of the internal combustion engine is stopped and the target electric conduction amount kEt, the relation between the temperature of the EHC 1 at that time and the target electric conduction amount kEt, and the relation between the particulate diameter of a PM deposited on the stuck-out parts 6a and 6b of the inner tube 6 and the target electric conduction amount kEt are stored in the ECU 20 in advance as a map or a function. In step S403, this map or function is used to calculate the target electric conduction amount kEt.

Next, in step S404, based on the PM deposit amount on the stuck-out parts 6a and 6b of the inner tube 6 when the operation of the internal combustion engine is stopped, the temperature of the EHC 1 at that time, and the particulate diameter of a PM deposited on the stuck-out parts 6a and 6b of the inner tube 6, the target time of electric conduction tehct to the EHC 1 after the operation of the internal combustion engine is stopped (hereinafter sometimes simply called the target electric conduction time) is calculated.

In this embodiment, the relations such as those shown in FIGS. 9, 11, and 13, that is, the relation between the PM deposit amount on the stuck-out parts 6a and 6b of the inner tube 6 when the operation of the internal combustion engine is stopped and the target electric conduction time tehct, the relation between the temperature of the EHC 1 at that time and the target electric conduction time tehct, and the relation between the particulate diameter of a PM deposited on the stuck-out parts 6a and 6b of the inner tube 6 and the target electric conduction time tehct are stored in the ECU 20 in advance as a map or a function. In step S404, this map or function is used to calculate the target electric conduction time tehct.

Next, in step S405, the amount of electric conduction kE to EHC 1 per unit time is controlled based on the target electric conduction amount kEt calculated in step S403.

The time of electric conduction to the EHC 1, tehc, at the current point in time after the operation of the internal combustion engine is stopped is calculated in step 104 and, after that, the processing of step S406 is executed. In step S406, the ECU 20 determines whether the time of electric conduction to the EHC 1 after the operation of the internal combustion engine is stopped (that is, the time elapsed during the period of electric conduction to the EHC 1 after the operation of the internal combustion engine is stopped), which is calculated in step S104, is equal to or smaller than the target electric conduction time tehct calculated in step S404.

If the ECU 20 determines affirmatively in step S406, the processing of step S106 is executed next. In step S106, electric conduction to the EHC 1 is continued. After that, the processing of steps S104 and 406 is executed again. On the other hand, if the ECU 20 determines negatively in step S406, electric conduction to the EHC 1 is stopped in step S103 next.

According to the flow described above, the larger, the amount of a PM deposited on the stuck-out parts 6a and 6b of the inner tube 6 when the operation of the internal combustion engine is stopped, or the lower the temperature of the EHC 1 when the operation of the internal combustion engine is stopped, or the larger the particulate diameter of a PM deposited on the stuck-out parts 6a and 6b of the inner tube 6, the larger is set the electric conduction amount per unit time when the EHC 1 is electrically conducted after the operation of the internal combustion engine is stopped. In addition, the larger the amount of a PM deposited on the stuck-out parts 6a and 6b of the inner tube 6 when the operation of the internal combustion engine is stopped, or the lower the temperature of the EHC 1 when the operation of the internal combustion engine is stopped, or the larger the particulate diameter of a PM deposited on the stuck-out parts 6a and 6b of the inner tube 6, the longer is set the electric conduction time when the EHC 1 is electrically conducted after the operation of the internal combustion engine is stopped.

Therefore, this embodiment can sufficiently oxidize and remove a PM deposited on the stuck-out parts 6a and 6b of the inner tube 6 while reducing power consumption as much as possible.

In this embodiment, both the target electric conduction amount and the target electric conduction time need not always be variable. That is, only one of the target electric conduction amount and the target electric conduction time may be changed according to the amount of a PM deposited on the stuck-out parts 6a and 6b of the inner tube 6 when the operation of the internal combustion engine is stopped, the temperature of the EHC 1 at that time, and the particulate diameter of a PM deposited on the stuck-out parts 6a and 6b of the inner tube 6, with the other being a constant value.

There is necessarily no need to calculate a target electric conduction amount based on all of the amount of a PM deposited on the stuck-out parts 6a and 6b of the inner tube 6 when the operation of the internal combustion engine is stopped, the temperature of the EHC 1 at that time, and the particulate diameter of a PM deposited on the stuck-out parts 6a and 6b of the inner tube 6. In other words, the target electric conduction amount may be calculated based on one or two of those values.

Neither is there a need to calculate a target electric conduction time based on all of the amount of a PM deposited on the stuck-out parts 6a and 6b of the inner tube 6 when the operation of the internal combustion engine is stopped, the temperature of the EHC 1 at that time, and the particulate diameter of a PM deposited on the stuck-out parts 6a and 6b of the inner tube 6. In other words, the target electric conduction amount may be calculated based on one or two of those values.

When the configuration of the EHC and its control system is similar to the configuration used in the modification of the first embodiment, the above-described control of the amount of electric conduction to the EHC 1 per unit time and the electric conduction time length, which are applied after the operation of the internal combustion engine is stopped, is applied to the control of the amount of electric conduction to the inner tube heater 10 per unit time and the electric conduction time length after the operation of the internal combustion engine is stopped. This gives an effect similar to that given by the control described above.

Similar electric control is performed also when a heater, which heats the end surface of the mat 5, is provided instead of the inner tube heater.

Fifth Embodiment

The general configuration of an EHC and its control system in this embodiment is similar to that of the EHC and its control system in the first embodiment. The following describes only the difference between this embodiment and the first embodiment in electric conduction control that is performed after the operation of the internal combustion engine is stopped.

[Electric Conduction Control after the Operation of the Engine is Stopped]

After the operation of the internal combustion engine is stopped, the ambient temperature of the EHC 1 is decreased as the time elapses. When the temperature of the EHC 1 is decreased, the amount of electric conduction to the EHC 1 must be increased because it is required to increase the temperature of the stuck-out parts 6a and 6b of the inner tube 6 to a temperature high enough to oxidize a PM deposited on the stuck-out parts 6a and 6b. To do so, the electric conduction amount per unit time is increased in this embodiment as the time elapses during the electric conduction period during which the EHC 1 is electrically conducted after the operation of the internal combustion engine is stopped.

Figure 16:
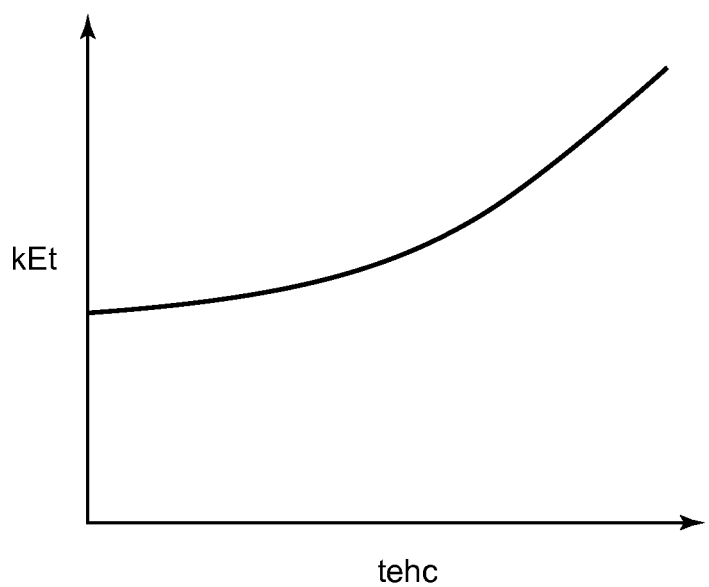
FIG. 16 is a diagram showing a relation in a fifth embodiment between a target amount of electric conduction kEt to an EHC per unit time after an operation of an internal combustion engine is stopped and a time of electric conduction to the EHC, tehc, after the operation of the internal combustion engine is stopped.

FIG. 16 is a diagram showing the relation in this embodiment between the target amount of electric conduction kEt to the EHC 1 per unit time after the operation of the internal combustion engine is stopped and the time of electric conduction to the EHC 1, tehc, after the operation of the internal combustion engine is stopped (that is, elapsed time during electric conduction to the EHC 1 after the operation of the internal combustion engine is stopped). As shown in FIG. 16, as the time of electric conduction to the EHC 1, tehc, after the operation of the internal combustion engine is stopped becomes longer, the target amount of electric conduction kEt to the EHC 1 per unit time after the operation of the internal combustion engine is stopped is increased.

Figure 17:
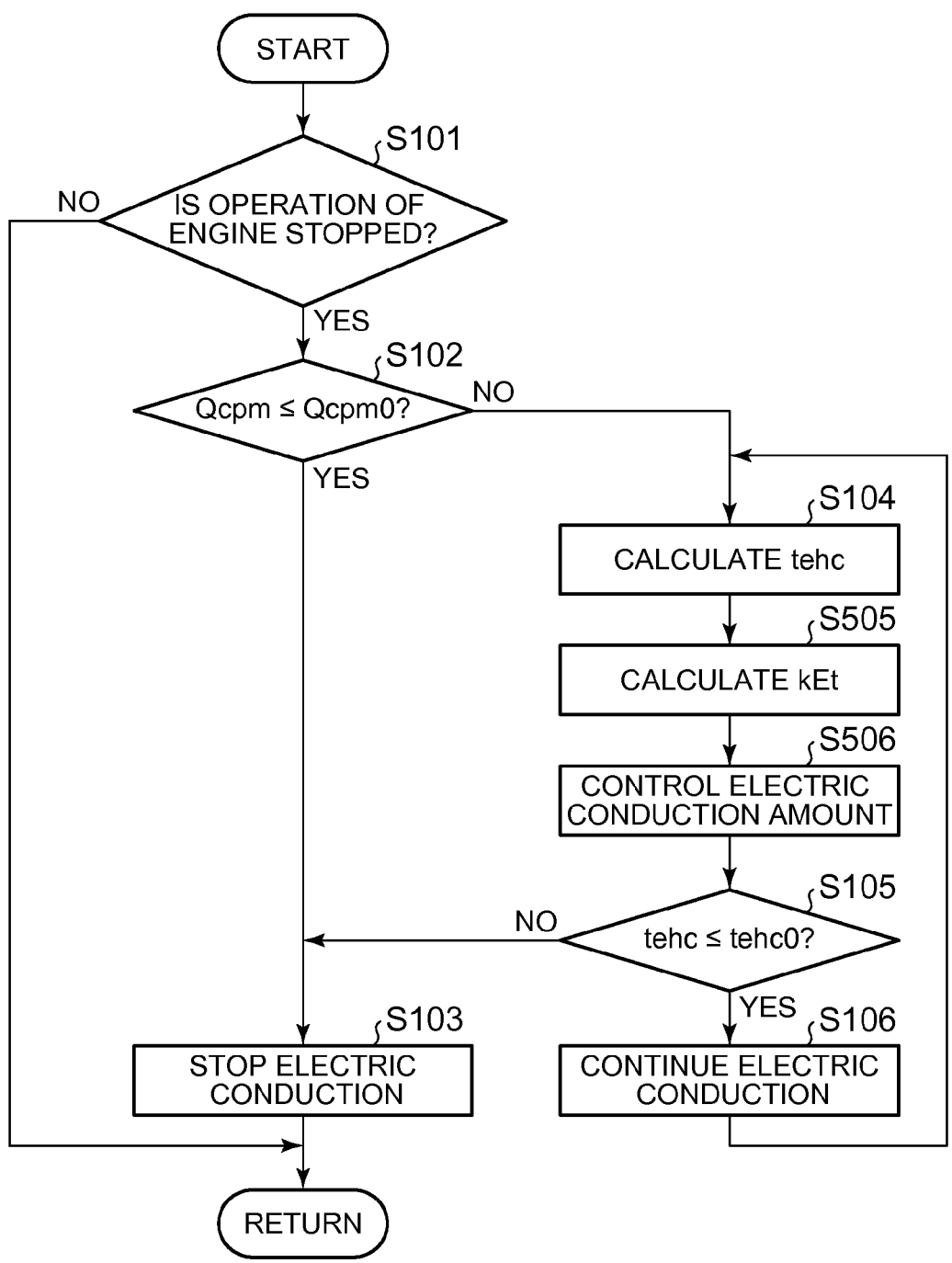
FIG. 17 is a flowchart showing a flow of electric conduction control after an operation of an internal combustion engine is stopped in the fifth embodiment.

The electric conduction control flow in this embodiment, which is performed after the operation of the internal combustion engine is stopped, is described below with reference to the flowchart in FIG. 17. This flow is stored in the ECU 20 in advance, and the ECU 20 repeatedly executes this flow. In this flow, it is assumed that the EHC 1 is electrically conducted when the operation of the internal combustion engine is stopped. For a step in this flow in which the processing similar to that of a step in the flow shown in FIG. 2 is executed, the same reference numeral as that in FIG. 2 is used and its description is omitted.

In this flow, the time of conduction to the EHC 1, tehc, at a current point in time after the operation of the internal combustion engine is stopped is calculated in step S104 and, after that, the processing of step S505 is executed. In step S505, the target amount of electric conduction kEt to the EHC 1 per unit time is calculated based on the electric conduction time tehc calculated in step S104.

In this embodiment, the relation between the time of electric conduction tehc to the EHC 1 after the operation of the internal combustion engine is stopped and the target amount of electric conduction kEt to the EHC 1 per unit time, such as that shown in FIG. 16, is stored in the ECU 20 as a map or a function. In step S505, this map or function is used to calculate the target amount of electric conduction kEt to the EHC 1 per unit time.

Next, in step S506, the amount of electric conduction kE to the EHC 1 per unit time is controlled based on the target electric conduction amount kEt calculated in step S505. After that, the processing of step S105 is executed.

According to the flow described above, the temperature of the EHC 1, that is, the temperature of the stuck-out parts 6a and 6b of the inner tube 6, can be maintained approximately at a constant value, at which a PM can be oxidized, during the period of electric conduction to the EHC 1 after the operation of the EHC 1 is stopped. This further facilitates the oxidization of a PM deposited on the stuck-out parts 6a and 6b of the inner tube 6.

When the configuration of the EHC and its control system is similar to the configuration used in the modification of the first embodiment, the above-described control of the amount of electric conduction to the EHC 1 per unit time, which is applied after the operation of the internal combustion engine is stopped, is applied to the control of the amount of electric conduction to the inner tube heater 10 per unit time after the operation of the internal combustion engine is stopped. This gives an effect similar to that given by the control described above.

Similar electric conduction is performed also when a heater, which heats the end surface of the mat 5, is provided instead of the inner tube heater.

Sixth Embodiment

The general configuration of an EHC and its control system in this embodiment is similar to that of the EHC and its control system in the first embodiment. The following describes only the difference between this embodiment and the first embodiment in electric conduction control that is performed after the operation of the internal combustion engine is stopped.

[Electric Conduction Control after the Operation of the Engine is Stopped]

In this embodiment, the air amount increase control is performed in which the amount of air is increased that is supplied to the EHC 1 when the EHC 1 is electrically conducted after the operation of the internal combustion engine is stopped. This control increases oxygen used to oxidize a PM deposited on the stuck-out parts 6a and 6b of the inner tube 6. As a result, this control further facilitates the oxidization of the PM.

Figure 18:
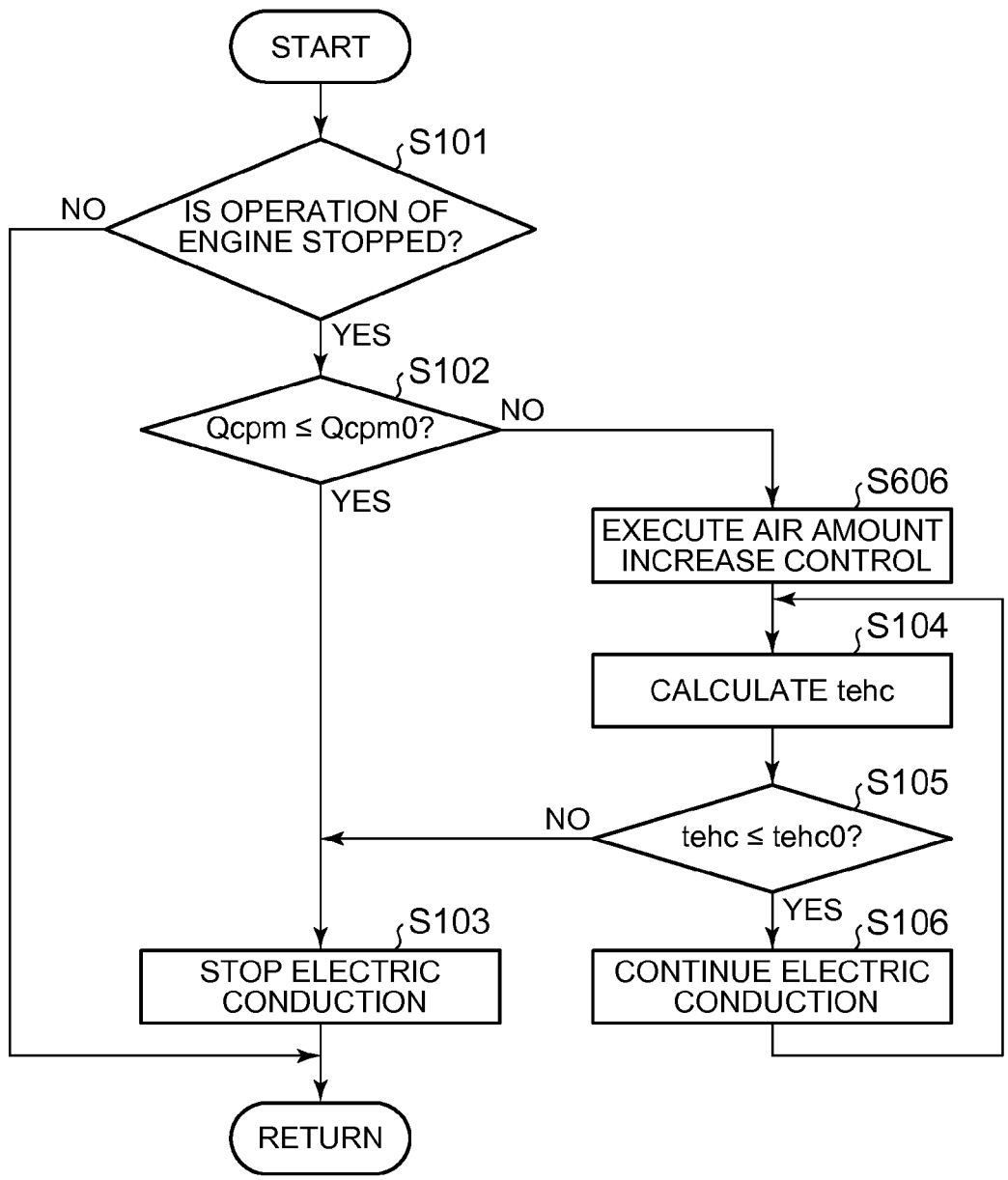
FIG. 18 is a flowchart showing a flow of electric conduction control after an operation of an internal combustion engine is stopped in a sixth embodiment.

The electric conduction control flow in this embodiment, which is performed after the operation of the internal combustion engine is stopped, is described below with reference to the flowchart in FIG. 18. This flow is stored in the ECU 20 in advance, and the ECU 20 repeatedly executes this flow. In this flow, it is assumed that the EHC 1 is electrically conducted when the operation of the internal combustion engine is stopped. For a step in this flow in which the processing similar to that of a step in the flow shown in FIG. 2 is executed, the same reference numeral as that in FIG. 2 is used and its description is omitted.

In this flow, if the ECU 20 determines negatively in step S102, the processing of step S606 is executed next. In step S606, the air amount increase control is performed. After that, the processing of step S104 is executed.

The air amount increase control is performed, for example, by controlling an increase in the throttle valve opening that controls the amount of air to be taken into the internal combustion engine. It is also possible to control the air amount increase by adjusting the valve timing of the intake and exhaust valve of the internal combustion engine. It is also possible to control the air amount increase by supplying secondary air to the exhaust pipe 2 on the upstream side of the EHC 1 through a secondary air supply device.

The air amount increase control described above may be applied also when the configuration of the EHC and its control system is similar to the configuration used in the modification of the first embodiment or when electric conduction control is performed by providing a heater, which heats the end surface of the mat 5, instead of the inner tube heater used in the modification.

The embodiments described above may be combined whenever possible.

DESCRIPTION OF REFERENCE NUMERALS

1 . . . Electrically heated catalyst (EHC)
2 . . . Exhaust pipe
3 . . . Catalyst carrier
4 . . . Case
5 . . . Mat
6 . . . Inner tube
6a,6b . . . Stuck-out parts
7 . . . Electrode
10 . . . Inner tube heater
11 . . . Electric supply control unit
20 . . . ECU
21 . . . Temperature sensor

The invention claimed is:

1. A control device for an electrically heated catalyst provided in an exhaust gas passage of an internal combustion engine, an air-fuel ratio of the internal combustion engine being controlled at a ratio near a theoretical air-fuel ratio at an operation time, the electrically heated catalyst including a heating element that is heated by electric conduction to heat the catalyst by the heating, a case that stores the heating element therein and an insulating member provided between the heating element and the case to insulate electricity, the control device for an electrically heated catalyst comprising:

an electric conduction control unit configured to electrically conduct the heating element after an operation of the internal combustion engine is stopped and when a temperature of the electrically heated catalyst or a temperature of an exhaust gas correlated with the temperature of the electrically heated catalyst when the operation of the internal combustion engine is stopped is equal to or higher than a first predetermined temperature, the electric conduction control unit configured to either inhibit electric conduction to the heating element or electrically conduct the heating element after a predetermined electric conduction stop period elapses from when the operation of the internal combustion engine is stopped, wherein when the temperature of the electrically heated catalyst or the temperature of the exhaust gas correlated with the temperature of the electrically heated catalyst when the operation of the internal combustion engine is stopped is equal to or lower than a second predetermined temperature, the electric conduction control unit inhibits electric conduction to the heating element.

2. The control device for an electrically heated catalyst according to claim 1 wherein when the temperature of the electrically heated catalyst or the temperature of an exhaust gas correlated with the temperature of the electrically heated catalyst when the operation of the internal combustion engine is stopped is low, the electric conduction control unit performs at least one of control to increase the electric conduction amount per unit time when electrically conducting the heating element and control to increase the electric conduction time when electrically conducting the heating element as compared when the temperature is high.

3. The control device for an electrically heated catalyst according to claim 1 wherein when a particulate diameter of a particulate matter deposited on an end of the insulating member is large, an electric conduction control unit performs at least one of control to increase the electric conduction amount per unit time when electrically conducting the heating element and control to increase an electric conduction time when electrically conducting the heating element as compared when the particulate diameter of a particulate matter is small.

4. The control device for an electrically heated catalyst according to claim 1 wherein
as time elapses, the electric conduction control unit increases the electric conduction amount per unit time during an electric conduction period when electrically conducting the heating element.

5. The control device for an electrically heated catalyst according to claim 1, further comprising:
an air amount increase unit that increases, via the electric conduction control unit, an amount of air to be supplied to the electrically heated catalyst when electrically conducting the heating element.

6. The control device for an electrically heated catalyst according to claim 1, further comprising:
a heater to which electricity is supplied via a path, different from a path via which electricity is supplied to the heating element, to heat an end of the insulating member wherein,
the electric conduction control unit controls electric conduction to the heater instead of electric conduction to the heating element after the operation of the internal combustion engine is stopped.

7. A control device for an electrically heated catalyst provided in an exhaust gas passage of an internal combustion engine, an air-fuel ratio of the internal combustion engine being controlled at a ratio near a theoretical air-fuel ratio at an operation time, the electrically heated catalyst including a heating element that is heated by electric conduction to heat the catalyst by the heating, a case that stores the heating element therein and an insulating member provided between the heating element and the case to insulate electricity,
the control device for an electrically heated catalyst comprising:
an electric conduction control unit configured to electrically conduct the heating element after an operation of the internal combustion engine is stopped and
when a temperature of the electrically heated catalyst or a temperature of an exhaust gas correlated with the temperature of the electrically heated catalyst when the operation of the internal combustion engine is stopped is equal to or higher than a first predetermined temperature, the electric conduction control unit configured to either inhibit electric conduction to the heating element or electrically conduct the heating element after a predetermined electric conduction stop period elapses from when the operation of the internal combustion engine is stopped,
wherein when a deposit amount of a particulate matter on an end of the insulating member when the operation of the internal combustion engine is stopped is equal to or smaller than a predetermined amount, the electric conduction control unit inhibits electric conduction to the heating element.

8. The control device for an electrically heated catalyst according to claim 7 wherein
when the temperature of the electrically heated catalyst or the temperature of an exhaust gas correlated with the temperature of the electrically heated catalyst when the operation of the internal combustion engine is stopped is low, the electric conduction control unit performs at least one of control to increase the electric conduction amount per unit time when electrically conducting the heating element and control to increase the electric conduction time when electrically conducting the heating element as compared when the temperature is high.

9. The control device for an electrically heated catalyst according to claim 7 wherein
when a particulate diameter of a particulate matter deposited on an end of the insulating member is large, an electric conduction control unit performs at least one of control to increase the electric conduction amount per unit time when electrically conducting the heating element and control to increase an electric conduction time when electrically conducting the heating element as compared when the particulate diameter of a particulate matter is small.

10. The control device for an electrically heated catalyst according to claim 7 wherein
as time elapses, the electric conduction control unit increases the electric conduction amount per unit time during an electric conduction period when electrically conducting the heating element.

11. The control device for an electrically heated catalyst according to claim 7, further comprising:
an air amount increase unit that increases, via the electric conduction control unit, an amount of air to be supplied to the electrically heated catalyst when electrically conducting the heating element.

12. The control device for an electrically heated catalyst according to claim 7, further comprising:
a heater to which electricity is supplied via a path, different from a path via which electricity is supplied to the heating element, to heat an end of the insulating member wherein,
the electric conduction control unit controls electric conduction to the heater instead of electric conduction to the heating element after the operation of the internal combustion engine is stopped.

13. A control device for an electrically heated catalyst provided in an exhaust gas passage of an internal combustion engine, an air-fuel ratio of the internal combustion engine being controlled at a ratio near a theoretical air-fuel ratio at an operation time, the electrically heated catalyst including a heating element that is heated by electric conduction to heat the catalyst by the heating, a case that stores the heating element therein and an insulating member provided between the heating element and the case to insulate electricity,
the control device for an electrically heated catalyst comprising:
an electric conduction control unit configured to electrically conduct the heating element after an operation of the internal combustion engine is stopped and
when a temperature of the electrically heated catalyst or a temperature of an exhaust gas correlated with the temperature of the electrically heated catalyst when the operation of the internal combustion engine is stopped is equal to or higher than a first predetermined temperature, the electric conduction control unit configured to either inhibit electric conduction to the heating element or electrically conduct the heating element after a predetermined electric conduction stop period elapses from when the operation of the internal combustion engine is stopped,
wherein when a deposit amount of a particulate matter on an end of the insulating member is large when the operation of the internal combustion engine is stopped, the electric conduction control unit performs at least one of control to increase an electric conduction amount per unit time when electrically conducting the heating element and control to increase an electric conduction time when electrically conducting the heating element as compared when the deposit amount of a particulate matter is small.

14. The control device for an electrically heated catalyst according to claim 13 wherein
when the temperature of the electrically heated catalyst or the temperature of an exhaust gas correlated with the temperature of the electrically heated catalyst when the operation of the internal combustion engine is stopped is low, the electric conduction control unit performs at least one of control to increase the electric conduction amount per unit time when electrically conducting the heating element and control to increase the electric conduction time when electrically conducting the heating element as compared when the temperature is high.

15. The control device for an electrically heated catalyst according to claim 13 wherein
when a particulate diameter of a particulate matter deposited on an end of the insulating member is large, an electric conduction control unit performs at least one of control to increase the electric conduction amount per unit time when electrically conducting the heating element and control to increase an electric conduction time when electrically conducting the heating element as compared when the particulate diameter of a particulate matter is small.

16. The control device for an electrically heated catalyst according to claim 13 wherein
as time elapses, the electric conduction control unit increases the electric conduction amount per unit time during an electric conduction period when electrically conducting the heating element.

17. The control device for an electrically heated catalyst according to claim 13, further comprising:
an air amount increase unit that increases, via the electric conduction control unit, an amount of air to be supplied to the electrically heated catalyst when electrically conducting the heating element.

18. The control device for an electrically heated catalyst according to claim 13, further comprising:
a heater to which electricity is supplied via a path, different from a path via which electricity is supplied to the heating element, to heat an end of the insulating member wherein,
the electric conduction control unit controls electric conduction to the heater instead of electric conduction to the heating element after the operation of the internal combustion engine is stopped.

* * * * *